(12) United States Patent
Akahori et al.

(10) Patent No.: US 9,567,459 B2
(45) Date of Patent: Feb. 14, 2017

(54) THERMOPLASTIC POLYMER COMPOSITION, SHEET OR FILM, AND MULTI-LAYERED FILM

(71) Applicant: KURARAY CO., LTD., Kurashiki-shi (JP)

(72) Inventors: Yosuke Akahori, Kamisu (JP); Daisuke Konishi, Kamisu (JP); Hiromichi Nakata, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/765,893

(22) PCT Filed: Mar. 4, 2014

(86) PCT No.: PCT/JP2014/055500
§ 371 (c)(1),
(2) Date: Aug. 5, 2015

(87) PCT Pub. No.: WO2014/136788
PCT Pub. Date: Sep. 12, 2014

(65) Prior Publication Data
US 2015/0368456 A1    Dec. 24, 2015

(30) Foreign Application Priority Data

Mar. 7, 2013   (JP) .................................. 2013-045217
Aug. 27, 2013  (JP) .................................. 2013-175353

(51) Int. Cl.
| | | |
|---|---|---|
| *C08L 53/02* | (2006.01) | |
| *C08L 33/12* | (2006.01) | |
| *B32B 27/06* | (2006.01) | |
| *B32B 27/20* | (2006.01) | |
| *B32B 27/30* | (2006.01) | |
| *C08L 33/06* | (2006.01) | |
| *C08J 5/18* | (2006.01) | |
| *C08K 5/00* | (2006.01) | |

(52) U.S. Cl.
CPC ............... *C08L 53/02* (2013.01); *B32B 27/06* (2013.01); *B32B 27/20* (2013.01); *B32B 27/308* (2013.01); *C08J 5/18* (2013.01); *C08K 5/0016* (2013.01); *C08L 33/06* (2013.01); *C08L 33/12* (2013.01); *B32B 2307/412* (2013.01); *B32B 2307/554* (2013.01); *B32B 2307/584* (2013.01); *C08J 2325/10* (2013.01); *C08J 2333/12* (2013.01); *C08J 2425/10* (2013.01); *C08J 2433/12* (2013.01); *C08L 2201/10* (2013.01); *C08L 2203/16* (2013.01); *C08L 2207/04* (2013.01)

(58) Field of Classification Search
CPC ............. C08L 53/02; C08L 33/12; C08J 5/18
See application file for complete search history.

(56) References Cited

U.S. PATENT DOCUMENTS

| | | | |
|---|---|---|---|
| 2004/0204530 A1 | 10/2004 | Masuda et al. | |
| 2005/0239963 A1* | 10/2005 | Kitano | B32B 27/32 |
| | | | 525/88 |
| 2006/0052534 A1 | 3/2006 | Suzuki et al. | |
| 2010/0067258 A1 | 3/2010 | Hahn et al. | |
| 2011/0218303 A1 | 9/2011 | Oshima et al. | |

FOREIGN PATENT DOCUMENTS

| | | |
|---|---|---|
| CN | 102209753 A | 10/2011 |
| JP | 5-230322 A | 9/1993 |
| JP | 5-294216 A | 11/1993 |
| JP | 5-345841 A | 12/1993 |
| JP | 6-329865 A | 11/1994 |
| JP | 2001-158812 A | 6/2001 |
| JP | 2004-2657 A | 1/2004 |
| JP | 2004-162047 A | 6/2004 |
| JP | 2004-196941 A | 7/2004 |
| JP | 2004-299273 A | 10/2004 |
| JP | 2004-307585 A | 11/2004 |
| JP | 2005-336464 A | 12/2005 |
| JP | 3839773 B2 | 11/2006 |
| JP | 2007-126527 A | 5/2007 |
| JP | 2010-514845 A | 5/2010 |
| JP | 2010-195882 A | 9/2010 |
| TW | 200415195 A | 8/2004 |

OTHER PUBLICATIONS

International Search Report issued Jun. 3, 2014 in PCT/JP2014/055500 filed Mar. 4, 2014.
Combined Taiwanese Office Action and Search Report issued Oct. 8, 2015 in Patent Application No. 103107567 (with English translation of categories of cited documents).

* cited by examiner

*Primary Examiner* — Robert Harlan
(74) *Attorney, Agent, or Firm* — Oblon, McClelland, Maier & Neustadt, L.L.P.

(57) ABSTRACT

Provided are a thermoplastic polymer composition having good mold processability, flexibility, rubber elasticity, scratch resistance, abrasion resistance, transparency, ease of coating, and mechanical properties when formed into a sheet or film, a sheet or film produced using the thermoplastic polymer composition, and a multi-layered film. The thermoplastic polymer composition includes (I) a block copolymer having a number average molecular weight of 30,000 to 200,000, or a hydrogenated product thereof, which has a polymer block (A) mainly composed of α-methylstyrene units and a polymer block (B) mainly composed of conjugated diene compound units or isobutylene units, (II) an acryl-based polymer, and (III) a softening agent at a ratio satisfying the formulae (1) and (2) as described in claim 1, and has a sea-island structure in which the components (II) are dispersed in the form of particles in a continuous phase including the component (I), in which the average dispersed particle diameter of the dispersed particles of the components (II) is 200 nm or less, and 35% by mass or more of the dispersed particles have dispersed particle diameters of less than 60 nm.

20 Claims, 2 Drawing Sheets

THERMOPLASTIC POLYMER COMPOSITION, SHEET OR FILM, AND MULTI-LAYERED FILM

TECHNICAL FIELD

The present invention relates to a thermoplastic polymer composition. The present invention further relates to a sheet or film, and a multi-layered film, each of which is produced using the thermoplastic polymer composition.

BACKGROUND ART

Among thermoplastic elastomers, styrene-based thermoplastic elastomers such as a styrene-butadiene-styrene block copolymer (SBS), a styrene-isoprene-styrene block copolymer (SIS), and hydrogenated products thereof are widely used from the viewpoints of excellent flexibility, rubber elasticity, recyclability, and the like with low cost.

Studies have been conducted so as to improve various physical properties of the styrene-based thermoplastic elastomers. For example, a thermoplastic elastomer resin composition for molding powder, which is used so as to obtain a molded article with soft texture and excellent scratch resistance, and includes a styrene-based thermoplastic elastomer, a polyurethane-based thermoplastic elastomer, and the like (see PTL 1); and a composition having excellent flexibility, mold processability, and scratch resistance, which is a thermoplastic elastomer composition obtained by adding a copolymer having units exhibiting compatibility with both of a styrene-based thermoplastic elastomer (a hydrogenated block copolymer) and a methacryl-based resin to a composition including both (see PTL 2) have been proposed.

Furthermore, there have been proposed a thermoplastic resin composition retaining surface characteristics such as surface hardness exhibited by an acryl-based resin, weather resistance, transparency, and the like, and also having properties such as flexibility and low-temperature characteristics, which is an acryl-based thermoplastic resin composition obtained by blending a hydrogenated product of a block copolymer including a polymer block (a) containing an aromatic vinyl compound having a specific molecular weight, and a polymer block (b) containing isoprene, or isoprene and butadiene, with an acryl-based resin having a specific intrinsic viscosity at a specific ratio (see PTL 3); and a thermoplastic resin composition having a block containing an a-b-a structure (a: a block containing aromatic vinyl monomers and b: a block containing isoprene and/or butadiene) with respect to an acryl-based resin, and containing a hydrogenated product of 3-component block copolymers having a specific number average molecular weight at a specific ratio (see PTL 4).

There has been proposed a composition having superior flexibility, weather resistance, and good appearance characteristics, which is a thermoplastic resin composition including a polyolefin-based resin (A), a hydrogenated product (B) of a thermoplastic block copolymer consisting of a block containing aromatic vinyl monomers and a block containing isoprene and/or butadiene, an acryl-based resin (C), a hydrocarbon-based softening agent (D), and a hydrogenated product (E) of a thermoplastic block copolymer consisting of a block containing aromatic vinyl monomers and a block containing isoprene and/or butadiene, having a polymerized product of an acryl-based monomer in a side chain thereof (see PTL 5).

The composition of PTL 1 has been tentatively improved due to its inferiority to a polyurethane-based thermoplastic elastomer with respect to scratch resistance, but it still has problems such as deteriorated performance and yellowing in a case of being formed into a molded article from the viewpoints of insufficient hydrolysis resistance and weather resistance. The compositions of PTLs 2 to 5 retain surface characteristics such as surface hardness exhibited by an acryl-based resin, weather resistance, transparency, and the like, and also have excellent properties of mold processability, transparency, and the like due to their sufficient flexibility. However, the scratch resistance and the abrasion resistance of the compositions were evaluated, and as a result, they are not sufficiently satisfactory.

Under these circumstances, there remains a demand for a thermoplastic polymer composition which can be effectively used in sites where the composition is subjected to frequent friction and applications where aesthetic appearance is important, for example.

In order to solve the above problems, PTL 6 proposes the following polymer composition.

A polymer composition including:
a block copolymer (a) with a weight average molecular weight of 30,000 to 200,000, which has a polymer block A mainly composed of α-methylstyrene and a polymer block B which may be hydrogenated, containing a conjugated diene or isobutylene, an acryl-based resin (b), and a softening agent (c), at a blending ratio (mass ratio) satisfying the following formulae (1) and (2):

$$0.05 \leq Wb/Wa \leq 2 \qquad (1)$$

$$Wc/(Wa+Wb+Wc) \leq 0.5 \qquad (2)$$

wherein Wa, Wb, and Wc represent the contents (by mass) of the respective components of the block copolymer (a), the acryl-based resin (b), and the softening agent (c), each of which constitutes the polymer composition.

CITATION LIST

Patent Literature

PTL 1: JP 2001-158812-A
PTL 2: JP 5-230322-A
PTL 3: JP 6-329865-A
PTL 4: JP 5-295216-A
PTL 5: JP 5-345841-A
PTL 6: JP 2004-2657-A

SUMMARY OF INVENTION

Technical Problem

The polymer composition disclosed in PTL 6, filed by the present applicant, is disclosed to have a sea-island structure in which the component (a) forms a continuous phase and the component (b) with an average dispersed particle diameter of 200 nm or less is dispersed therein. Further, it is also described that the composition has all of good mold processability, flexibility, rubber elasticity, mechanical properties, and transparency, and also has scratch resistance and abrasion resistance, compatible with a polyurethane-based thermoplastic elastomer and a polyester-based thermoplastic elastomer.

However, the present inventors have further investigated the technology disclosed in PTL 6, and as a result, it has been proved that it still needs some additional improvements in transparency, ease of coating (for example, ease of transfer of a printing ink and difficulty in bleeding) and mechanical properties when formed into a sheet or film.

Therefore, it is an object of the present invention to provide a thermoplastic polymer composition having all of good mold processability, flexibility, and rubber elasticity, and capable of further improving transparency, ease of coating, and mechanical properties when formed into a sheet or film, while maintaining scratch resistance and abrasion resistance compatible with a polyurethane-based thermoplastic elastomer and a polyester-based thermoplastic elastomer; and a sheet or film produced using the thermoplastic polymer composition, and a multi-layered film having a layer containing the thermoplastic polymer composition.

Solution to Problem

According to the present invention, the above-described object is accomplished by providing [1] to [10] below.

[1] A thermoplastic polymer composition including:
(I) a block copolymer having a number average molecular weight of 30,000 to 200,000, or a hydrogenated product thereof, which has a polymer block (A) mainly composed of α-methylstyrene units and a polymer block (B) mainly composed of conjugated diene compound units or isobutylene units;
(II) an acryl-based polymer, and
(III) a softening agent
at a ratio satisfying the following formulae (1) and (2):

$$0.05 \leq W(II)/W(I) \leq 2 \quad (1)$$

$$0 \leq W(III)/(W(I)+W(II)+W(III)) \leq 0.5 \quad (2)$$

wherein W(I), W(II), and W(III) represent the contents (by mass) of the block copolymer (I), the acryl-based polymer (II), and the softening agent (III), respectively, in the thermoplastic polymer composition; and having a sea-island structure in which the acryl-based polymer (II) is dispersed in the form of particles in a continuous phase including the block copolymer (I), in which the average dispersed particle diameter of the dispersed particles of the acryl-based polymer (II) is 200 nm or less, and 35% by mass or more of the dispersed particles have dispersed particle diameters of less than 60 nm.

[2] The thermoplastic polymer composition as described in [1], in which the haze value measured in accordance with JIS K 7105, using a specimen molded to have a thickness of 200 μm, is 1.4 or less.

[3] The thermoplastic polymer composition as described in [1] or [2], in which when a needle having a diameter of 1 mm and a tip radius of 0.5 mm is thrust into a specimen molded to have a thickness of 200 μm at a speed of 50 mm/min in accordance with JIS Z 1707, the thrust strength at a time of needle penetration is 19 N or more.

[4] The thermoplastic polymer composition as described in any one of [1] to [3], in which in the block copolymer (I),
the number average molecular weight of the polymer block (A) is 2,000 to 20,000, and
the polymer block (B) includes a block (b1) having a content of 1,4-bond structural units of the conjugated diene compound units of less than 30% by mole, and a block (b2) with a number average molecular weight of 3,500 to 65,000, having a content of 1,4-bond structural units of the conjugated diene compound units of 30% by mole or more.

[5] The thermoplastic polymer composition as described in any one of [1] to [4], in which the specific gravity measured by an immersion method in accordance with ISO 1183 is 0.9 g/cm³ to 1.08 g/cm³.

[6] The thermoplastic polymer composition as described in any one of [1] to [5], in which 40% by mass to 60% by mass of the dispersed particles of the acryl-based polymer (II) have a dispersed particle diameter of less than 60 nm.

[7] A sheet or film produced using the thermoplastic polymer composition as described in any one of [1] to [6].

[8] The sheet or film as described in [7], in which the haze value of a specimen having a thickness of 200 μm, measured in accordance with JIS K 7105, is 1.4 or less, and
when a needle having a diameter of 1 mm and a tip radius of 0.5 mm is thrust into a specimen with a thickness of 200 μm at a speed of 50 mm/min, the thrust strength at a time of needle penetration is 19 N or more in accordance with JIS Z 1707.

[9] A multi-layered film including a layer containing the thermoplastic polymer composition as described in any one of [1] to [6].

[10] A method for producing the sheet or film as described in [7], including a step of performing molding by using a film molding device including a static mixer.

Advantageous Effects of Invention

According to the present invention, it is possible to provide a thermoplastic polymer composition having all of good mold processability, flexibility, and rubber elasticity, and capable of further improving transparency, ease of coating (for example, ease of transfer of a printing ink and difficulty in bleeding), and mechanical properties when formed into a sheet or film, while maintaining scratch resistance and abrasion resistance compatible with a polyurethane-based thermoplastic elastomer and a polyester-based thermoplastic elastomer; a sheet or film produced using the thermoplastic polymer composition; and a multi-layered film having a layer containing the thermoplastic polymer composition.

DESCRIPTION OF EMBODIMENTS

Figure 1:
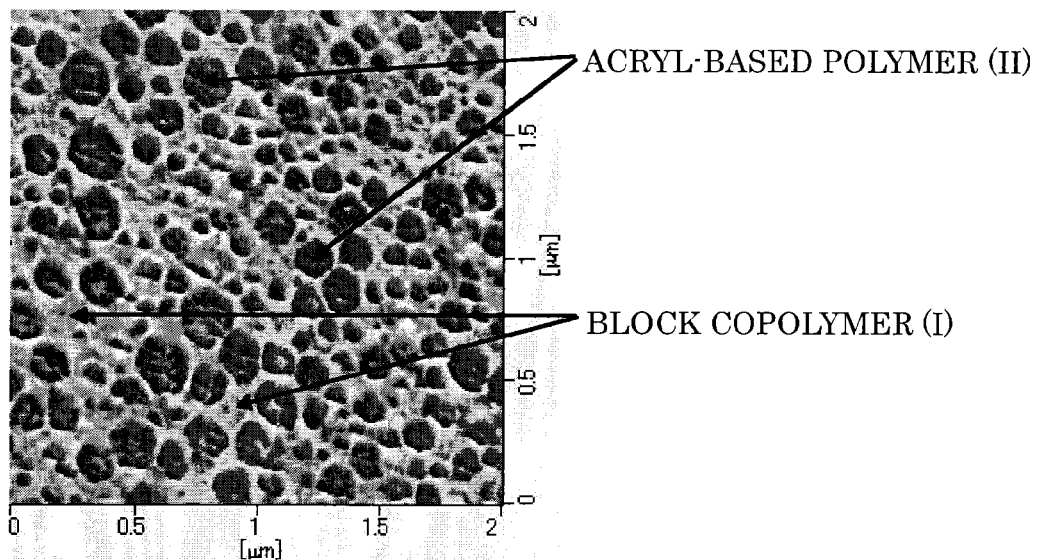
FIG. 1 is an image of the phase structure of a film produced using the thermoplastic polymer composition (A-1) obtained in Example 1, as observed by scanning probe microscopy (SPM).

The thermoplastic polymer composition of the present invention is a thermoplastic polymer composition including:
(I) a block copolymer having a number average molecular weight of 30,000 to 200,000, or a hydrogenated product thereof, which has a polymer block (A) mainly composed of α-methylstyrene units and a polymer block (B) mainly composed of conjugated diene compound units or isobutylene units (hereinafter sometimes referred to as a block copolymer (I));
(II) an acryl-based polymer (hereinafter sometimes referred to as an acryl-based polymer (II)); and
(III) a softening agent (hereinafter sometimes referred to as a softening agent (III))
at a ratio satisfying the following formulae (1) and (2):

$$0.05 \leq W(II)/W(I) \leq 2 \quad (1)$$

$$0 \leq W(III)/(W(I)+W(II)+W(III)) \leq 0.5 \quad (2)$$

wherein W(I), W(II), and W(III) represent the contents of the block copolymer (I), the acryl-based polymer (II), and the softening agent (III), respectively, in the thermoplastic polymer composition; and having a sea-island structure in which the acryl-based polymer (II) is dispersed in the form of particles in a continuous phase including the block copolymer (I), in which the average dispersed particle diameter of the dispersed particles of the acryl-based polymer (II) is 200 nm or less, and 35% by mass or more of the dispersed particles have dispersed particle diameters of less than 60 nm.

In the thermoplastic polymer composition of the present invention, not only the average dispersed particle diameter of the dispersed particles of the acryl-based polymer (II) is 200 nm or less, but also 35% by mass or more of the dispersed particles have dispersed particle diameters of less than 60 nm, as described above.

The present inventors have conducted detailed studies on the polymer composition disclosed in PTL 6, and as a result, it was demonstrated that the average dispersed particle diameter itself of the dispersed particles of the acryl-based polymer (II) is 200 nm or less, but dispersed particles with various sizes covering large or small dispersed particle diameters are also present.

On the other hand, the thermoplastic polymer composition of the present invention is controlled such that 35% by mass or more of the dispersed particles of the acryl-based polymer (II) have dispersed particle diameters of less than 60 nm, and due to its phase structure, a sheet or film produced using the thermoplastic polymer composition with all of better transparency, ease of coating, and mechanical properties has been successfully provided.

Hereinafter, the respective components will be described in order.

Furthermore, in the following description, the restrictive wording with "being preferable" can be arbitrarily chosen and a combination of restrictive wordings with "being preferable" means being more preferable.

[Block Copolymer (I)]

The block copolymer (I) for use in the present invention is a block copolymer having a number average molecular weight of 30,000 to 200,000, or a hydrogenated product thereof, which has a polymer block (A) mainly composed of α-methylstyrene units and a polymer block (B) mainly composed of conjugated diene compound units or isobutylene units.

As compared with a case where a block copolymer or a hydrogenated product thereof with units other than the α-methylstyrene units, for example, styrene units are used for the polymer block (A), the transparency, the ease of coating, and the mechanical properties are significantly improved by using the block copolymer (I).

The total content of the polymer block (A) and the polymer block (B) in the block copolymer (I) is preferably 70% by mass or more, more preferably 80% by mass or more, still more preferably 90% by mass or more, and particularly preferably 95% by mass or more. The value is a value obtained not considering residues of a coupling agent as described later.

(Polymer Block (A))

The polymer block (A) constituting a part of the block copolymer (I) is mainly composed of α-methylstyrene units. The expression "being mainly composed of" as used herein means being composed of the α-methylstyrene units in an amount of 50% by mass or more based on the total mass of the polymer block (A). The content of the α-methylstyrene units in the polymer block (A) is more preferably 70% by mass or more, still more preferably 90% by mass or more, and particularly preferably 95% by mass or more, based on the total mass of the polymer block (A), from the viewpoints of the transparency, the ease of coating, and the mechanical properties of the thermoplastic polymer composition.

Within a range not impeding the object of the present invention as described above, the polymer block (A) may usually contain other monomer units in the amount of preferably 50% by mass or less, more preferably 30% by mass or less, still more preferably 10% by mass or less, and particularly preferably 5% by mass or less, based on the total mass of the polymer block (A). Examples of such other monomers include at least one selected from aromatic vinyl compounds such as styrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, and 4-(phenylbutyl)styrene; conjugated diene compounds such as butadiene, isoprene, 2,3-dimethyl-1,3-butadiene, 1,3-pentadiene, and 1,3-hexadiene; and vinyl compounds such as isobutylene. In particular, styrene and p-methylstyrene are suitable. In a case where the polymer block (A) contains other polymerizable monomer units, it may contain such other polymerizable monomer units in any of random and tapered forms.

The number average molecular weight of the polymer block (A) is preferably 2,000 to 20,000, and more preferably 3,000 to 15,000. If the number average molecular weight of the polymer block (A) is 2,000 or more, the thermoplastic polymer composition has good permanent compression set at a high temperature, whereas if the number average molecular weight of the polymer block (A) is 20,000 or less, the melt viscosity of the block copolymer (I) is not increased too much, and the block copolymer (I) becomes easily melt-mixed with other components and has excellent processability. Further, the number average molecular weight as mentioned in the present specification is a molecular weight relative to polystyrene as a standard, as determined by measurement with gel permeation chromatography (GPC).

The content of the polymer block (A) in the block copolymer (I) is preferably 5% by mass to 70% by mass, more preferably 10% by mass to 65% by mass, still more preferably 20% by mass to 60% by mass, and particularly preferably 25% by mass to 55% by mass, based on the total mass of the polymer blocks (A) and (B). If the content of the polymer block (A) is 5% by mass or more, improved mechanical properties of the thermoplastic polymer composition, good permanent compression set at a high temperature, and excellent heat resistance are attained. If the content of the polymer block (A) is 70% by mass or less, the melt viscosity of the block copolymer (I) is not increased too much, and the block copolymer becomes easily melt-mixed with other components and has excellent flexibility when formed into a thermoplastic polymer composition.

(Polymer Block (B))

The polymer block (B) constituting a part of the block copolymer (I) is mainly composed of conjugated diene compound units or isobutylene units, and is preferably mainly composed of conjugated diene compound units. The expression "being mainly composed of" as used herein means being composed of the conjugated diene compound units or isobutylene units in an amount of 50% by mass or more based on the total mass of the polymer block (B). The content of the conjugated diene compound units or isobutylene units in the polymer block (B) is more preferably 70% by mass or more, still more preferably 90% by mass or more, and particularly preferably 95% by mass or more, based on the total mass of the polymer block (B).

Examples of the conjugated diene compound that forms the conjugated diene compound unit include at least one selected from butadiene, isoprene, 2,3-dimethyl-1,3-butadiene, 1,3-pentadiene, 1,3-hexadiene, and the like. Among these, butadiene, isoprene, or a mixture of butadiene and isoprene is preferred, and butadiene is more preferred. In a case where two or more kinds of the conjugated diene compound units are contained, they may be contained in any of random, block, and tapered forms.

Furthermore, the polymer block (B) may contain other polymerizable monomers other than the conjugated diene compound units and the isobutylene units if the amount of such other monomers is usually preferably 50% by mass or less, more preferably 30% by mass or less, still more preferably 10% by mass or less, and particularly preferably 5% by mass or less, based on the total mass of the polymer block (B), within a range not impeding the purpose of the present invention. Preferable examples of the monomers include at least one aromatic vinyl compound selected from styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, 4-(phenylbutyl)styrene, and the like. If the polymer block (B) contains monomers other than the conjugated diene compound units and the isobutylene units, it may contain such other monomers in any of random and tapered forms.

Moreover, the block copolymer (I) may be a hydrogenated product, in which a non-hydrogenated product is subjected to hydrogen addition (sometimes referred to as "hydrogenation"). It is preferable that the block copolymer (I) is hydrogenated from the viewpoints of improvement of heat resistance and weather resistance, and the like.

Although the hydrogen addition rate (hydrogenation rate) is not particularly limited, preferably 70% by mole or more, more preferably 80% by mole or more, still more preferably 85% by mole or more, even still more preferably 90% by mole or more, and particularly preferably 95% by mole or more of the carbon-carbon double bonds based on the conjugated diene compound units in the entire polymer block (B) are hydrogenated. The hydrogenation rate of the carbon-carbon double bonds in the conjugated diene polymer block is a value calculated using a nuclear magnetic resonance spectrum ($^1$H-NMR spectrum), which shall apply hereinafter.

The content of the polymer block (B) in the block copolymer (I) is preferably 30% by mass to 95% by mass, more preferably 35% by mass to 90% by mass, still more preferably 40% by mass to 80% by mass, and particularly preferably 45% by mass to 75% by mass, based on the total mass of the polymer blocks (A) and (B). If the content of the polymer block (B) is 30% by mass or more, the melt viscosity of the block copolymer (I) is not increased too much and the block copolymer becomes easily melt-mixed with other components, whereas if the content of the polymer block (B) is 95% by mass or less, the permanent compression set at a high temperature is excellent when formed into a thermoplastic polymer composition.

The number average molecular weight of the polymer block (B) is preferably 9,000 to 190,000. If the number average molecular weight of the polymer block (B) is 9,000 or more, the heat resistance of the thermoplastic polymer composition is improved, whereas if the number average molecular weight is 190,000 or less, the melt viscosity of the block copolymer (I) is not increased too much and the block copolymer is easily mixed with other components, and thus, has excellent processability.

(Bonding Type of Polymer Block (A) and Polymer Block (B))

The bonding type of the polymer block (A) and the polymer block (B) in the block copolymer (I) may be any of linear, branched, and radial types, or a combination thereof, and among these, a linear type, a branched type, or a combination thereof is preferred.

For example, when A indicates the polymer block (A) and B indicates the polymer block (B), examples of such a block copolymer include an A-B type diblock copolymer, an A-B-A type triblock copolymer, an A-B-A-B type tetrablock copolymer, and an (A-B)nX type copolymer, wherein X represents a residue of a coupling agent, and n is an integer of 3 or more. The block copolymers of these bonding types may be used alone or in combination of two or more kinds thereof. Among these, an A-B-A type triblock copolymer, or a mixture of an A-B-A type triblock copolymer and an A-B type diblock copolymer is preferred as the block copolymer (I).

Here, in the present specification, in a case where the same kind of polymer blocks are linearly bonded to each other through a divalent coupling agent or the like, the whole polymer block bonded is handled as one polymer block. Thus, including those exemplified, more strictly, excluding a case where a polymer block to be denoted by Y-X-Y, wherein X represents a residue of a coupling agent, needs to be distinguished from a single polymer block Y, the polymer block is collectively denoted as Y. In the present specification, since such a polymer block containing a residue of a coupling agent is handled as above, it includes, for example, a residue of a coupling agent, and strictly, a block copolymer to be denoted by Y-Z-X-Z-Y, wherein X represents a residue of a coupling agent, is denoted as Y-Z-Y and handled as one example of the triblock copolymer.

Furthermore, a polymer block (C) including other polymerizable monomers such as methyl methacrylate and styrene, in addition to the α-methylstyrene, the conjugated diene compound, and isobutylene, may be present in the block copolymer (I) within a range not impeding the purpose of the present invention. In this case, when the polymer block (C) is represented by C, examples of the structure of the block copolymer include an A-B-C type triblock copolymer, an A-B-C-A type tetrablock copolymer, and an A-B-A-C type tetrablock copolymer.

(Method for Producing Block Copolymer (I))

The block copolymer (I) can be produced by an anionic polymerization method in a case where the polymer block (B) is mainly composed of the conjugated diene compound units, and specific synthesis examples therefor are as follows.

<Polymerization>

(1) A method for obtaining an A-B-A type block copolymer by polymerizing a conjugated diene compound in a tetrahydrofuran solvent using a dianionic initiator, and subsequently polymerizing α-methylstyrene under a condition of a temperature of −78° C. (see Macromolecules, vol. 2, pp. 453-458 (1969)).

(2) A method for obtaining an (A-B)nX type block copolymer by bulk-polymerizing α-methylstyrene using an anionic initiator and subsequently polymerizing a conjugated diene compound, and then carrying out a coupling reaction by a coupling agent such as tetrachlorosilane (see Kautsch. Gummi. Kunstst., vol. 37, pp. 377-379 (1984); and Polym. Bull., vol. 12, pp. 71-77 (1984)).

(3) A method for obtaining an A-B-A type block copolymer by polymerizing α-methylstyrene at a concentration of 5% by mass to 50% by mass at temperature of −30° C. to 30° C. in a nonpolar solvent using an organolithium compound as a polymerization initiator in the presence of a polar compound at a concentration of 0.1% by mass to 10% by mass, polymerizing a conjugated diene compound with the obtained living polymer, and then adding a coupling agent thereto.

(4) A method for obtaining an A-B-C type block copolymer by polymerizing α-methylstyrene at a concentration of 5% by mass to 50% by mass at temperature of −30° C. to 30° C. in a nonpolar solvent using an organolithium compound as a polymerization initiator in the presence of a polar compound at a concentration of 0.1% by mass to 10% by mass, polymerizing a conjugated diene compound with the obtained living polymer, and then polymerizing an anion polymerizable monomer other than α-methylstyrene with a living polymer of a block copolymer including the obtained α-methylstyrene polymer block and a conjugated diene polymer block.

Among the methods, the methods (3) and (4) are preferable, and the method (3) is more preferable.

Examples of the organolithium compound used as a polymerization initiator in the methods above include monolithium compounds such as methyl lithium, ethyl lithium, pentyl lithium, n-butyl lithium, sec-butyl lithium, and tert-butyl lithium, and dilithium compounds such as tetraethylene dilithium.

The solvent used for the polymerization of α-methylstyrene is a nonpolar solvent, and examples thereof include aliphatic hydrocarbons such as cyclohexane, methylcyclohexane, n-hexane, and n-pentane, and aromatic hydrocarbons such as benzene, toluene, and xylene.

The polar compound used for the polymerization of α-methylstyrene is a compound not having a functional group (such as a hydroxy group and a carbonyl group) that reacts with an anionic species but having a hetero atom such as an oxygen atom and a nitrogen atom in the molecule, and examples thereof include dimethyl ether, diethyl ether, monoglyme, N,N,N',N'-tetramethylethylene diamine, triethylamine, N-methylmorpholine, dimethoxyethane, diethylene glycol dimethyl ether, and tetrahydrofuran.

When α-methylstyrene is polymerized at a high conversion ratio and a conjugated diene compound is then polymerized, the concentration of the polar compound in the reaction system is preferably 0.1% by mass to 10% by mass, and more preferably 0.5% by mass to 3% by mass, from the viewpoint of controlling the amount of the 1,4-bonds in the polymer block (B).

From the viewpoints of the polymerization of α-methylstyrene at a high conversion ratio and the viscosity of the reaction solution in the late stages of polymerization, the concentration of α-methylstyrene in the reaction system is preferably in the range of 5% by mass to 50% by mass, and more preferably in the range of 25% by mass to 40% by mass.

Furthermore, the conversion ratio means the ratio of the amount of α-methylstyrene converted to the block copolymer (I) during polymerization of non-polymerized α-methylstyrene, and in the present invention, the conversion ratio is preferably 70% by mass or more, and more preferably 85% by mass or more.

From the viewpoints of the ceiling temperature (a temperature at which the polymerization reaction reaches an equilibrium state and does not substantially proceed) of α-methylstyrene, the polymerization rate of α-methylstyrene, the living properties, and the like, the temperature condition during polymerization of α-methylstyrene is preferably −30° C. to 30° C., more preferably −20° C. to 10° C., and still more preferably −15° C. to 0° C. By setting the polymerization temperature to 30° C. or lower, α-methylstyrene can be polymerized at a high conversion ratio. In addition, the deactivation ratio of the produced living polymer is small, and the mixing of homopoly-α-methylstyrene into the obtained block copolymer is suppressed, so that the physical properties may not be less likely to be impaired. By setting the polymerization temperature to −30° C. or higher, the reaction solution can be stirred while preventing an increase in the viscosity of the reaction solution in the late stages of the polymerization of α-methylstyrene. Therefore, the cost for maintaining a low-temperature state is not required, which is thus economically preferable.

In the above methods, another aromatic vinyl compound may be allowed to coexist during the polymerization of α-methylstyrene and be copolymerized with α-methylstyrene as long as the characteristics of the α-methylstyrene polymer block are not impaired. Examples of the aromatic vinyl compound include at least one selected from styrene, o-methylstyrene, m-methylstyrene, p-methylstyrene, 1,3-dimethylstyrene, vinylnaphthalene, and vinylanthracene.

Since a living poly-α-methylstyryl lithium is produced by the polymerization of α-methylstyrene using organolithium as a polymerization initiator, a conjugated diene compound is then copolymerized with the living poly-α-methylstyryl lithium.

The conjugated diene compound is added to a reaction system to be subjected to polymerization. A method for adding the conjugated diene compound to the reaction system is not particularly limited, and the conjugated diene compound may be directly added to a living poly-α-methylstyryl lithium solution or may be diluted with a solvent and then added.

For a method for adding the conjugated diene compound after diluting it in a solvent, a conjugated diene compound may be added and then diluted with a solvent; a conjugated diene compound and a solvent may be introduced at the same time; or a conjugated diene compound may be added after dilution with a solvent. Preferably, recommended is a method, in which a conjugated diene compound is added in an amount corresponding to 1 molar equivalent to 100 molar equivalents, and preferably 5 molar equivalents to 50 molar equivalents, based on the living poly-α-methylstyryl lithium, whereby the living active terminals are modified, and the mixture then is diluted with a solvent and subsequently, the rest of the conjugated diene compound is introduced and subjected to a polymerization reaction at a temperature of higher than 30° C., and preferably of 40° C. to 80° C.

To modify the living poly-α-methylstyryl lithium at the active terminals thereof, an aromatic vinyl compound such as styrene, o-methylstyrene, m-methylstyrene, p-methylstyrene, 1,3-dimethylstyrene, vinylnaphthalene, vinylanthracene, and 1,1-diphenylethylene may be used instead of the conjugated diene compound.

Examples of the solvent used herein for dilution include aliphatic hydrocarbons such as cyclohexane, methylcyclohexane, n-hexane, and n-heptane, and aromatic hydrocarbons such as benzene, toluene, and xylene.

The block copolymer (I) thus obtained can be acquired by pouring a polymerization reaction liquid into methanol or the like for coagulation, followed by heating or drying under reduced pressure, or by pouring a polymerization reaction liquid into boiling water to remove the entire solvent through azeotropy, so-called steam stripping, followed by heating or drying under reduced pressure.

A triblock or radial teleblock type block copolymer can be produced by reacting, for example, a polyfunctional coupling agent with a living polymer of a block copolymer including an α-methylstyrene polymer block and a conjugated diene polymer block, obtained by copolymerization of the conjugated diene compound with the living poly-α-methylstyryl lithium.

The block copolymer in this case may be a mixture containing, in any proportions, diblock, triblock, and radial teleblock type block copolymers, which are obtained by adjusting the amount of the polyfunctional coupling agent to be used.

Examples of the polyfunctional coupling agent include phenyl benzoate, methyl benzoate, ethyl benzoate, methyl acetate, ethyl acetate, methyl pivalate, ethyl pivalate, phenyl pivalate, α,α'-dichloro-o-xylene, α,α'-dichloro-m-xylene, α,α'-dichloro-p-xylene, bis(chloromethyl)ether, dibromomethane, diiodomethane, dimethyl phthalate, dichlorodimethylsilane, dichlorodiphenylsilane, trichloromethylsilane, tetrachlorosilane, and divinylbenzene.

<Hydrogen Addition Reaction>

The block polymer including a polymer block (A) mainly composed of α-methylstyrene units and a polymer block (B) mainly composed of conjugated diene compound units may be formed by hydrogen addition (sometimes referred to as hydrogenation) of a part (for example, 70% or more) of carbon-carbon double bonds based on the conjugated diene compound units in the block copolymer, as described above, from the viewpoints of good heat resistance and weather resistance.

In a case of hydrogenating the block copolymer, it is possible to obtain a hydrogenated product by polymerizing a conjugated diene compound with the living poly-α-methylstyryl lithium, and then adding an active hydrogen compound such as alcohols, carboxylic acids, and water to terminate the polymerization reaction, and carrying out hydrogenation in an inert organic solvent in the presence of a hydrogenation catalyst according to a known method.

In addition, in a case of hydrogenating a triblock or radial teleblock type block copolymer obtained by reacting a polyfunctional coupling agent with the living polymer of the copolymer, it is possible to obtain a hydrogenated product by adding an active hydrogen compound such as alcohols, carboxylic acids, and water, as necessary, to terminate the coupling reaction, and then carrying out hydrogenation in an inert organic solvent in the presence of a hydrogenation catalyst according to a known method.

The block copolymer, a non-hydrogenated A-B-C type triblock copolymer obtained by polymerizing an anion polymerizable monomer other than α-methylstyrene and a conjugated diene compound with the block copolymer, or a non-hydrogenated triblock type block copolymer or a non-hydrogenated radial teleblock type block copolymer (both included in the "block copolymer (I)" used in the present invention) obtained by reacting a polyfunctional coupling agent with a living polymer of a block copolymer including the polymer block (A) and the polymer block (B) as it is can be subjected to a hydrogen addition reaction without replacing the solvent that has been used for the production thereof.

The hydrogenation reaction can be carried out under the conditions of a reaction temperature of 20° C. to 100° C. and a hydrogen pressure of 0.1 MPa to 10 MPa in the presence of a hydrogenation catalyst.

Examples of the hydrogenation catalyst include: Raney nickel; heterogeneous catalysts in which a metal such as platinum (Pt) palladium (Pd), ruthenium (Ru), rhodium (Rh), and nickel (Ni) is supported on a carrier such as carbon, alumina, and diatomaceous earth; Ziegler type catalysts including combinations of organic metal compounds including Group 8 metals such as nickel and cobalt with an organoaluminum compound or organolithium compounds such as triethylaluminum and triisobutylaluminum; and metallocene-based catalysts including combinations of bis(cyclopentadienyl) compounds of transition metals such as titanium, zirconium, and hafnium with organic metal compounds each containing lithium, sodium, potassium, aluminum, zinc, magnesium, or the like.

As the hydrogenated block copolymer (I), those obtained by the above method are preferably used.

The block copolymer (I) can be prepared by a cationic polymerization method in a case where the polymer block (B) is mainly composed of the isobutylene units, and specific synthesis examples therefor are as follows.

For example, the block copolymer (I) having the polymer block (B) consisting of isobutylene is obtained through ordinary cationic living polymerization, using 1,4-di(2-methoxy-2-propyl)benzene, 1,4-di(2-chloro-2-propyl)benzene, or the like. For example, a living polymer is obtained by cationically polymerizing isobutylene under the temperature conditions of −90° C. to −10° C., using an initiator having a combination of 1,4-di(2-methoxy-2-propyl)benzene or 1,4-di(2-chloro-2-propyl)benzene with a Lewis acid such as titanium tetrachloride in a hydrocarbon solvent such as hexane and methylcyclohexane or a halogenated hydrocarbon solvent such as methyl chloride and methylene chloride, by further adding pyridine, 2,6-di-t-butylpyridine, or the like as necessary, and subsequently by cationically polymerizing α-methylstyrene, a poly(α-methylstyrene)-polyisobutylene-poly(α-methylstyrene)triblock copolymer can be prepared.

(Properties and States of Block Copolymer (I))

In the thermoplastic polymer composition of the present invention, the number average molecular weight of the block copolymer (I) is 30,000 to 200,000. If the number average molecular weight is within this range, the obtained thermoplastic polymer composition can be excellent in any of transparency, ease of coating, and mechanical properties. From this viewpoint, the number average molecular weight of the block copolymer (I) is preferably 40,000 to 150,000, and more preferably 40,000 to 100,000.

The structure is not limited to a linear shape, a branched shape, or the like.

As the block copolymer (I) used in the present invention, those obtained by the above-described method are preferably used, and in particular, those obtained by polymerizing α-methylstyrene at a concentration of 5% by mass to 50% by mass at a temperature of −30° C. to 30° C. in the presence of a polar compound at a concentration of 0.1% by mass to 10% by mass, using an organolithium compound as an initiator in a non-polar solvent, and subsequently, first, polymerizing a conjugated diene compound in the amount of 1 molar equivalent to 100 molar equivalents with respect to the living poly-α-methylstyryl lithium during the polymerization of a conjugated diene compound, thereby forming a block (b1), and then, further adding a conjugated diene compound at a temperature which is 30° C. higher than that of the reaction system to carry out polymerization, thereby forming a block (b2), are preferred from the viewpoint of excellent characteristics as a thermoplastic polymer composition in a wide temperature range. That is, in this case, the polymer block (B) includes the block (b1) and the block (b2).

The structure of the block copolymer (I) is not limited to a linear shape, a branched shape, or the like, but as the block copolymer (I), a block copolymer including a structure represented by a formula A-b1-b2 is preferred. Examples of the block copolymer include an A-b1-b2-b2-b1-A type copolymer, a mixture of an A-b1-b2-b2-b1-A type copolymer and an A-b1-b2 type copolymer, and an (A-b1-b2)nX type copolymer, wherein X represents a residue of a coupling agent and n is an integer of 2 or more. Among these, a block copolymer having at least one (A-b1-b2) structure is preferred, and examples thereof include an A-b1-b2-b2-b1-A type copolymer, a mixture of an A-b1-b2-b2-b1-A type copolymer and an A-b1-b2 type copolymer, an (A-b1-b2)nX type copolymer, wherein X represents a residue of a coupling agent and n is an integer of 2 or more, and a mixture of an (A-b1-b2)nX type copolymer and an A-b1-b2 type copolymer. Among these, from the viewpoints of mold processability, mechanical properties, or the like, an (A-b1-b2)nX type copolymer, and a mixture of an (A-b1-b2)nX type copolymer and an A-b1-b2 type copolymer are preferable, and an $(A-b1-b2)_2X$ type copolymer, and a mixture of an $(A-b1-b2)_2X$ type copolymer and an A-b1-b2 type copolymer are particularly preferable.

The number average molecular weight of the block (b1) in the polymer block (B) in the block copolymer (I) is preferably in the range of 1,000 to 30,000, and further, the content of the 1,4-bond units of the conjugated diene compound units constituting the block (b1) is preferably less than 30% by mole (more preferably 5% by mole to 25% by mole, and still more preferably 10% by mole to 20% by mole). If the number average molecular weight of the block (b1) is within the above range, the copolymer can be more conveniently produced. Further, the number average molecular weight of the block (b2) is preferably in the range of 3,500 to 85,000, and more preferably in the range of 3,500 to 65,000. Further, the content of the 1,4-bond structural units of the conjugated diene compound units constituting the block (b2) is preferably 30% by mole or more (preferably 30% by mole to 80% by mole, and more preferably 40% by mole to 70% by mole). In this case, the block copolymer (I) may be either a hydrogenated or non-hydrogenated block copolymer. If the number average molecular weight of the block (b2) is within the above range, the secondary processability into a film, a sheet, or the like is excellent.

In addition, the content of the 1,4-bond structural units in the entire polymer block (B) is preferably 20% by mole to 80% by mole, and more preferably 30% by mole to 70% by mole.

[Acryl-Based Polymer (II)]

The acryl-based polymer (II) for use in the present invention is preferably at least one selected from copolymers obtained by copolymerizing other copolymerizable monomers mainly composed of a homopolymer of methyl methacrylate (II-1) and methyl methacrylate (II-2).

Examples of the other copolymerizable monomers include olefin-based compounds such as ethylene and propylene; acrylic acids or metal salts thereof; acrylic esters such as methyl acrylate, ethyl acrylate, n-butyl acrylate, s-butyl acrylate, t-butyl acrylate, and 2-ethylhexyl acrylate; methacrylic acids or metal salts thereof; methacrylic esters such as ethyl methacrylate, n-butyl methacrylate, s-butyl methacrylate, t-butyl methacrylate, 2-hydroxyethyl methacrylate, glycidyl methacrylate, and cyclohexyl methacrylate; vinyl acetate; aromatic vinyl compounds such as styrene, α-methylstyrene, and p-methylstyrene; maleic anhydride; and maleimide-based compounds such as N-methyl maleimide, N-phenyl maleimide, and N-cyclohexyl maleimide.

In a case where these are copolymerized with methyl methacrylate, they may be used alone or in combination of two or more kinds thereof. For a copolymer obtained by copolymerizing methyl methacrylate with the other copolymerizable monomers, the proportion of the other copolymerizable monomers is preferably a proportion that does not significantly affect the properties of the acryl-based polymer (II). Specifically, the proportion is preferably 30% by mass or less, and more preferably 25% by mass or less.

The acryl-based polymer (II) is preferably a homopolymer of methyl methacrylate, that is, polymethyl methacrylate (PMMA). A combination of PMMA with at least one selected from an ethylene-methyl acrylate copolymer (EMA), an ethylene-ethyl acrylate copolymer (EEA), and an ethylene-butyl acrylate copolymer (EBA) is preferably used. As the copolymer to be used in combination with PMMA, EMA is more preferred from the viewpoint of making it possible to adjust viscosity of a thermoplastic polymer composition more easily.

The melt flow rate (measured in accordance with ISO 1133, conditions: 230° C., 37.3 N) of the acryl-based polymer (II) is preferably 1 g/10 minutes to 56 g/10 minutes, more preferably 5 g/10 minutes to 46 g/10 minutes, and still more preferably 9 g/10 minutes to 36 g/10 minutes.

The acryl-based polymer (II) can be produced by common polymerization techniques such as solution polymerization, emulsion polymerization, and suspension polymerization, and a method for producing the same is not particularly limited. Further, in the present invention, known acryl-based polymers can be used as the acryl-based polymer (II) without particular limitation. Examples thereof include ACRYPET (registered trademark) series (manufactured by Mitsubishi Rayon Co., Ltd.), DELPET (registered trademark) series (manufactured by Asahi Kasei Chemicals Corporation), SUMIPEX (registered trademark) series (manufactured by Sumitomo Chemical Co., Ltd.), and PARAPET (registered trademark) series (manufactured by Kuraray Co., Ltd.).

In addition, for example, an ethylene-methyl acrylate copolymer (EMA), an ethylene-ethyl acrylate copolymer (EEA), an ethylene-butyl acrylate copolymer (EBA), or the like, each manufactured by Du Pont-Mitsui Polychemicals Co., Ltd. can also be used.

[Softening Agent (III)]

As the softening agent (III) for use in the present invention, for example, known softening agents including hydrocarbon-based oil such as paraffin-based, naphthene-based, and aromatic oil; vegetable oil such as peanut oil and rosin; phosphoric ester; low-molecular-weight polyethylene glycol; liquid paraffin; and hydrocarbon-based synthetic oil such as a low-molecular-weight polyethylene, an ethylene-α-olefin copolymer oligomer, liquid polybutene, liquid polyisoprene or a hydrogenated product thereof, and liquid polybutadiene or a hydrogenated product thereof can be used. These softening agents may be used alone or in combination of two or more kinds thereof. Among these, hydrocarbon-based oil such as paraffin-based oil, or hydrocarbon-based synthetic oil such as an ethylene-α-olefin copolymerization oligomer is preferably used.

From the viewpoints of mold processability and ease of coating, the dynamic viscosity at 40° C. of the softening agent (III) is preferably 50 $mm^2$/s to 1,000 $mm^2$/s, more preferably 50 $mm^2$/s to 800 $mm^2$/s, and still more preferably 80 $mm^2$/s to 600 $mm^2$/s.

(Content Ratio of Block copolymer (I), Acryl-based Polymer (II), and Softening Agent (III))

The thermoplastic polymer composition of the present invention contains the block copolymer (I), the acryl-based polymer (II), and the softening agent (III) at a ratio satisfying the following formulae (1) and (2):

$$0.05 \leq W(II)/W(I) \leq 2 \quad (1)$$

$$0 \leq W(III)/(W(I)+W(II)+W(III)) \leq 0.5 \quad (2)$$

wherein W(I), W(II), and W(III) represent the content (by mass) of the block copolymer (I), the content (by mass) of the acryl-based polymer (II), and the content (by mass) of the softening agent (III), respectively, in the thermoplastic polymer composition.

In the formula (1), if the value of "W(II)/W(I)", that is, the content ratio (by mass) of the acryl-based polymer (II) to the block copolymer (I) in the thermoplastic polymer composition is less than 0.05, the ease of coating and the mechanical properties become insufficient, whereas if the value of "W(II)/WW" is more than 2, the flexibility, the rubber elasticity, the transparency, and the mechanical properties of the thermoplastic polymer composition are deteriorated. The value of "W(II)/W(I)" is preferably 0.3 to 1.9, more preferably 0.3 to 1.6, still more preferably 0.4 to 1.6, and particularly preferably 0.6 to 1.3.

Furthermore, if the value of "W(III)/(W(I)+W(II)+W(III))", that is, the content ratio (by mass) of the softening agent (III) to the total amount of the block copolymer (I), the acryl-based polymer (II), and the softening agent (III) is more than 0.5, the ease of coating and the mechanical properties are deteriorated.

Incidentally, the lower limit of "W(III)/(W(I)+W(II)+W(III))" is 0 and the softening agent (III) may not be contained. However, from the viewpoints of transparency, ease of coating, and mold processability, it is preferable that the softening agent (III) is contained. The value of "W(III)/(W(I)+W(II)+W(III))" is preferably 0.01 to 0.5, more preferably 0.01 to 0.3, and still more preferably 0.03 to 0.3.

In addition, from the viewpoints of transparency, ease of coating, and mechanical properties, the value of "W(I)/(W(I)+W(II)+W(III))" is preferably 0.1 to 0.8, more preferably 0.2 to 0.8, and still more preferably 0.2 to 0.7.

[Other Components]

The thermoplastic polymer composition of the present invention may contain thermoplastic polymers other than the block copolymer (I) and the acryl-based polymer (II), as necessary. Examples of such other thermoplastic polymers include polyethylene such as a medium-density polyethylene and a low-density polyethylene (LDPE); ethylene and α-olefin copolymers such as an ethylene and 1-butene copolymer, an ethylene and 1-hexene copolymer, an ethylene and 1-heptene copolymer, an ethylene and 1-octene copolymer, an ethylene and 4-methyl-1-pentene copolymer, an ethylene and 1-nonene copolymer, and an ethylene and 1-decene copolymer; an ethylene and vinyl acetate copolymer; polypropylene such as atactic polypropylene, isotactic polypropylene, and syndiotactic polypropylene; polyolefin-based resins such as an ethylene and propylene random copolymer and an ethylene and vinyl acetate copolymer; styrene-based resins such as polystyrene, poly(α-methylstyrene), and a styrene and acrylonitrile copolymer; a styrene-based block copolymer having a block containing styrene, other than the block copolymer (I), as a hard segment; and polyphenylene oxide, polycarbonate, a thermoplastic polyolefin elastomer, and a crosslinkable thermoplastic polyolefin elastomer. These may be used alone or in combination of two or more kinds thereof.

Among those, polyethylene and polypropylene are preferred, and polypropylene is more preferred. The melt flow rates of polyethylene and polypropylene are preferably 5 g/10 minutes to 60 g/10 minutes, and more preferably 10 g/10 minutes to 60 g/10 minutes.

In a case where such other thermoplastic polymers are contained, the content thereof is preferably 60% by mass or less, and more preferably 50% by mass or less, with respect to the thermoplastic polymer composition.

Furthermore, the thermoplastic polymer composition of the present invention may contain, in addition to the components as described above, other components. Examples of such other components include inorganic fillers such as talc, clay, mica, calcium silicate, glass, hollow glass spheres, glass fibers, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fibers, activated carbon, hollow carbon spheres, calcium titanate, lead zirconate titanate, silicon carbide, and mica; organic fillers such as wood flour and starch; and organic pigments.

In addition, the thermoplastic polymer composition may contain a thermal stabilizer, a light stabilizer, an ultraviolet absorber, an antioxidant, a lubricant, a coloring agent, an antistatic agent, a flame retardant, a foaming agent, a water repellant, a water-proofing agent, a tackifying resin, an electrical conductivity-imparting agent, a heat conductivity-imparting agent, an electromagnetic wave shielding property-imparting agent, a fluorescent agent, an antiblocking agent, and an antibacterial agent, as necessary.

In a case where the thermoplastic polymer composition of the present invention contains such other components (excluding "such other thermoplastic polymers"), the content thereof is not particularly limited within a range not significantly impeding the effect of the present invention, but it is each usually preferably 30 parts by mass or less, more preferably each 20 parts by mass or less, and still more preferably each 10 parts by mass or less, with respect to 100 parts by mass of total amount of the components (I) to (III).

(Phase Structure)

The thermoplastic polymer composition of the present invention, containing the respective components, has a sea-island structure in which the acryl-based polymer (II) is dispersed in the form of particles in a continuous phase including the block copolymer (I), the average dispersed particle diameter of the dispersed particles of the acryl-based polymer (II) is 200 nm or less, and 35% by mass or more of the dispersed particles have dispersed particle diameters of less than 60 nm, and preferably 40 nm or more and less than 60 nm.

In the present invention, the dispersed particles of the acryl-based polymer (II) are not only controlled to have an average dispersed particle diameter of 200 nm or less, but also controlled such that 35% by mass or more (preferably 40% by mass or more, more preferably 60% by mass or less, still more preferably 55% by mass or less, and even still more preferably 50% by mass or less) of the dispersed particles of the acryl-based polymer (II) have dispersed particle diameters of less than 60 nm (preferably 40 nm or more and less than 60 nm). In this regard, when formed into a sheet or film, as compared with the sheet or film of a polymer composition disclosed in PTL 6, all of the good transparency, the ease of coating, and mechanical properties can be satisfied. An exact reason therefor is not clear, but it is presumed that a subtle change in the phase structure further increases the transparency.

In addition, the phase structures can be identified by the method described in Examples below, and the average dispersed particle diameter of the acryl-based polymer (II) is a value determined by calculating an average value of 100 values obtained by measuring the long diameters of the dispersed particles that can be observed by micrography (for example, scanning probe microscopy) with a ruler, and dividing the length values by the micrograph magnifications.

(Characteristics and Physical Properties of Thermoplastic Polymer Composition)

The Shore A hardness of the thermoplastic polymer composition of the present invention is approximately 30 to 100.

Since the thermoplastic polymer composition is light with a specific gravity of approximately 0.9 g/cm$^3$ to 1.10 g/cm$^3$, it is suitably used in any of applications.

The melt flow rate (MFR) is in the range of approximately 0.5 g/10 minutes to 40 g/10 minutes, and more specifically, 0.5 g/10 minutes to 35 g/10 minutes. If the MFR is in this range, flowability and mold processability are improved.

The tensile strength is approximately 35 MPa to 60 MPa, and the elongation at break is approximately 180% to 500%.

Furthermore, the haze value measured in accordance with JIS K 7105, using a specimen molded with the thermoplastic polymer composition of the present invention to have a thickness of 200 μm, is preferably 1.4 or less, more preferably 1.3 or less, and still more preferably 1.2 or less, and it is sometimes 0.9 or less. That is, a molded product produced using the thermoplastic polymer composition of the present invention is excellent in transparency.

When a needle having a diameter of 1 mm and a tip radius of 0.5 mm is thrust into a specimen molded to have a thickness of 200 μm at a speed of 50 mm/min, the thrust strength at a time of needle penetration is 19 N or more, and usually 19 N to 33 N.

In addition, the above values of the physical properties are all values measured according to the method described in Examples as described later.

(Method for Producing Thermoplastic Polymer Composition)

The thermoplastic polymer composition of the present invention can be produced by the following method.

Specifically, first, all the components to be mixed are melt-kneaded by a method known in the related art to produce pellets. For example, the respective constituents are melt-kneaded using a kneading device such as a single screw extruder, a twin screw extruder, a Banbury mixer, a brabender, an open roll, and a kneader to obtain pellets of the thermoplastic polymer composition. At this time, the kneading temperature is generally preferably 160° C. to 280° C., and more preferably 190° C. to 260° C.

For the melt-kneading, for example, any of the following methods may be employed:

(1) a method in which all of the components constituting the thermoplastic polymer composition are preliminarily dry-blended in a mixer such as a high-speed mixer and a tumbler mixer before kneading, and then melt-kneaded at once;

(2) a method in which the components except the softening agent (III) are first fed to an extruder in advance to initiate melt-kneading, a predetermined amount of the softening agent (III) is added to the extruder using a side feeder or the like during the process, and then all of the components are melt-kneaded; and (3) a method in which the components except the acryl-based polymer (II) are preliminarily melt-kneaded, and a predetermined amount of the acryl-based polymer (II) is added to the extruder using a side feeder or the like during the process, and then all of the components are melt-kneaded.

The thermoplastic polymer composition thus obtained can be molded and processed by any of various molding methods such as an injection molding method (such as an insert molding method, a two-color molding method, a sandwich molding method, and a gas injection molding method), an extrusion molding method, an inflation molding method, a T-die film molding method, a laminate molding method, a blow molding method, a hollow molding method, a compression molding method, and a calendar molding method.

Figure 3:
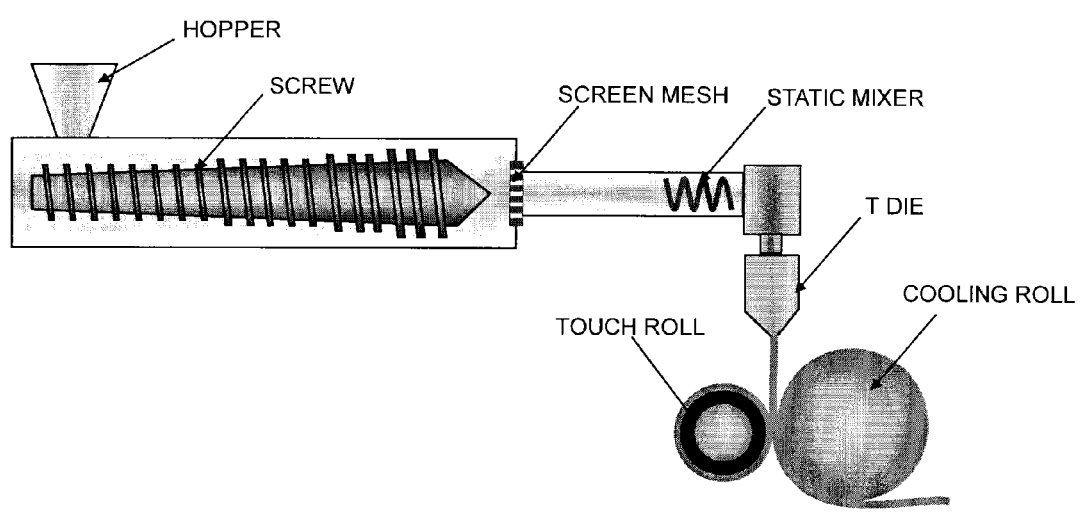
FIG. 3 is a conceptual view of one example of a device for producing a sheet or film using a thermoplastic polymer composition according to the present invention.

The present invention also provides a sheet or film thus obtained. A method for producing the sheet or film preferably has a step of carrying out molding using a film molding machine including a static mixer, from the viewpoint of transparency, ease of coating, and mechanical properties. More specifically, the film molding device is arranged such that the static mixer is continuously connected to the outlets of a kneading device such as a single screw extruder, a twin screw extruder, a Banbury mixer, a brabender, an open roll, and a kneader, as described above, used in the production of a pellet by melt-kneading all of the components constituting the thermoplastic polymer composition of the present invention, so as to carry out film molding, and at this time, it is preferable that the static mixer is arranged in front of the T die (see FIG. 3). In addition, the film molding may also be carried out through direct melt-kneading, by omitting the step of producing the pellets.

In the film molding, from the viewpoint of increasing the transparency, the cylinder temperature in the static mixer is preferably 180° C. to 240° C., more preferably 190° C. to 240° C., and still more preferably 200° C. to 230° C. The die head temperature is preferably 210° C. to 250° C., and more preferably 220° C. to 240° C. The screw speed is preferably 20 rpm to 70 rpm, and more preferably 20 rpm to 60 rpm. Further, the cast roll temperature is preferably 70° C. to 110° C., and more preferably 80° C. to 100° C.

The number of elements in the static mixer is not particularly limited, but from the viewpoint of transparency and dispersibility, the number is 2 or more, more preferably 4 or more, and still more preferably 6 or more. On the other hand, from the viewpoint of mold processability, the number of the elements is preferably 20 or less, more preferably 16 or less, and still more preferably 12 or less. In addition, in a case where the number of the elements is 20 or more, the effect of improving the transparency and the dispersibility reaches a plateau. Therefore, the number of the elements in the static mixer is preferably from 2 to 20, more preferably 4 to 16, and still more preferably 6 to 12.

In order to obtain the transparency and the mechanical properties, a film-like resin extruded from a T die is preferably allowed to pass through a gap under pressure with at least a pair of pressurization rolls to prepare a film. More preferably, it is desirable that at least one of the pair of pressurization rolls is an elastic metal roll. Further, from the viewpoints of inhibition of contamination by foreign materials and fish-eye, and from the viewpoint of the transparency, it is preferable that the film molding device contains a screen mesh. The number of the meshes in the screen mesh is not particularly limited, but from the viewpoints of inhibition of contamination by foreign materials and fisheye, the number of the meshes is preferably 50 or more, more preferably 70 or more, and still more preferably 90 or more, and from the viewpoint of obtaining transparency, the number of the meshes is preferably 300 or less, more preferably 250 or less, and still more preferably 150 or less. From the above, the number of the meshes in the screen mesh is preferably 50 to 300, more preferably 70 to 250, and still more preferably 90 to 150. In addition, the transparency can be enhanced by inhibiting the dispersed particles in the resin from being enlarged by shear when a molten resin passes through the screen mesh. Further, in the present specification, the number of the meshes means the number of meshes that are present within 1 inch (25.4 mm) defined by ASTM E11.

Generally, the sheet and film is not clearly distinguished, but there is a tendency that one with a thickness of 200 μm or less is referred to as a film, and one having more than the thickness is referred to as a sheet. The same shall apply in the present invention.

The upper limit of the thickness of the sheet or film is preferably 800 μm, more preferably 600 μm, still more preferably 400 μm, and particularly preferably 300 μm. In addition, the lower limit of the thickness of the sheet or film is preferably 10 μm, more preferably 30 μm, still more preferably 50 μm, and particularly preferably 80 μm.

(Multi-Layered Film)

The present invention also provides a multi-layered film having layers containing the thermoplastic polymer composition of the present invention. Further, the "multi-layered film" herein as mentioned in the present specification is intended to include a multi-layer sheet, and thus means a "multi-layered film or multi-layer sheet", but for the sake of convenience, it is hereinafter referred to as a multi-layered film in a simplified manner.

The multi-layered film may include a layer containing the thermoplastic polymer composition of the present invention in any position. That is, the layer may be a bottom layer, a top layer (surface layer), or an intermediate layer. Further, the layer containing the thermoplastic polymer composition of the present invention may be a single layer, or may be two or more layers.

The thickness of each layer included in the multi-layered film is preferably 3 μm to 500 μm, more preferably from 5 μm to 300 μm, and still more preferably 7 μm to 200 μm.

Examples of the material constituting layers other than the layer containing the thermoplastic polymer composition of the present invention include thermoplastic resins, various metals, various types of fabric, various types of leather, various types of glass, and various types of wood. Among these, it is preferable to use the thermoplastic resins.

Examples of the thermoplastic resin include polyphenylene ether resins; polyamide-based resins such as polyamide 6, polyamide 6.6, polyamide 6.10, polyamide 11, polyamide 12, polyamide 6.12, polyhexamethylene diamine terephthalamide, and polyhexamethylene diamine isophthalamide; polyester resins such as polyethylene terephthalate and polybutylene terephthalate; acryl-based resins such as methyl polyacrylate and polymethyl methacrylate (PMMA); polyoxymethylene-based resins such as a polyoxymethylene homopolymer and a polyoxymethylene copolymer; styrene-based resins such as polystyrene, an acrylonitrile-styrene resin (AS resin), and an acrylonitrile-butadiene-styrene resin (ABS resin); polycarbonate resins; olefin-based elastomers such as ethylene-propylene rubber (EPM) and ethylene-propylene-non-conjugated diene rubber (EPDM); styrene-based thermoplastic elastomers such as a styrene-butadiene block copolymer, a styrene-isoprene block copolymer, or a hydrogenated product thereof (excluding the block copolymer (I) for use in the present invention); olefin-based resins such as polyethylene and polypropylene; chlorosulfonated polyethylene; polyurethane-based thermoplastic elastomers; polyamide-based thermoplastic elastomers; and polyester-based thermoplastic elastomers; and resin compositions containing styrene-based thermoplastic elastomers {for example, a resin composition containing a styrene-based thermoplastic elastomer, an olefin-based resin, a softening agent, and the like (provided that the thermoplastic polymer composition of the present invention is excluded)}.

Among those, as the thermoplastic resin, the olefin-based resins, the olefin-based elastomers, and the acryl-based resins are preferred.

Although the number of layers constituting the multi-layered film of the present invention is not particularly limited, in particular, the layer containing the thermoplastic polymer composition of the present invention is preferably a multi-layered film composed of three layers of any of a top layer, an intermediate layer, and a bottom layer. Among these, from the viewpoint of adhesion between the layers, it is preferable that a layer containing the thermoplastic polymer composition of the present invention is used as an intermediate layer, and both of the top layer and the bottom layer are each a layer consisting of an olefin-based resin, an olefin-based thermoplastic elastomer, or an acryl-based resin.

If the layer containing the thermoplastic polymer composition of the present invention is referred to as an "X layer", specifically, the following layer configurations (the top and bottom layers are arbitrary) are preferred from the viewpoints of adhesion between the layers.

Olefin-based resin layer/X layer/olefin-based resin layer

Olefin-based resin layer/X layer/olefin-based thermoplastic elastomer layer

Olefin-based thermoplastic elastomer layer/X layer/olefin-based thermoplastic elastomer layer Olefin-based resin layer/X layer/acryl-based resin layer Olefin-based thermoplastic elastomer layer/X layer/acryl-based resin layer Acryl-based resin layer/X layer/acryl-based resin layer By using a layer containing the thermoplastic polymer composition of the present invention as the intermediate layer, a sheet and a film, formed of a polar resin and a non-polar resin, can be firmly adhered.

(Method for Producing Multi-Layered Film)

A method for producing the multi-layered film of the present invention is not particularly limited. Molding into a sheet or film shape may be performed by employing an injection molding method such as an insert injection molding method, a two-color injection molding method, and a sandwich injection molding method; an extrusion molding method such as a T die laminate molding method, a co-extrusion molding method, and an extrusion coating method; a calendar molding method; or a melt-involving molding method such as a press molding method.

For example, preferable examples of a method for producing a multi-layered film including three layers include a method of carrying out co-extrusion molding using the thermoplastic polymer composition of the present invention and two kinds of the thermoplastic resins.

EXAMPLES

Hereinafter, the present invention will be described in more detail by way of Examples and the like. However, the present invention is not limited to such Examples.

Furthermore, the following are used as the respective components used in Examples and Comparative Examples below.

Moreover, the number average molecular weight was determined as a value relative to polystyrene as a standard by carrying out gel permeation chromatography (GPC) measurement under the following conditions.

(Conditions for GPC Measurement)

Column: "TSKgel G4000HXL" (trade name)×2, product of Tosoh Corporation (column temperature: 40° C.)

Mobile phase: tetrahydrofuran (flow rate: 1 ml/min)

Detector: differential refractometer (a multi-wavelength detector (detection wavelength: 254 nm) is further connected)

Standard material: TSK standard polystyrene, product of Tosoh Corporation

Sample concentration: 0.06% by mass

[Production of Block Copolymer (I)]

Production Example 1

Production of Block Copolymer (I)-1

A pressure container equipped with a stirrer, which had been purged with nitrogen, was charged with 90.9 g of α-methylstyrene, 138 g of cyclohexane, 15.2 g of methylcyclohexane, and 3.2 g of tetrahydrofuran. To the mixed liquid was added 9.8 ml of sec-butyl lithium (a 1.3 M cyclohexane solution), and the mixture was subjected to polymerization at −10° C. for 3 hours to form a polymer block (A). The number average molecular weight (Mn) of poly(α-methylstyrene) (polymer block (A)) after 3 hours from polymerization initiation was 6,600 and the polymerization conversion ratio of α-methylstyrene was 89%.

Subsequently, 23 g of butadiene was added to the reaction mixed liquid, the mixture was stirred at −10° C. for 30 minutes and polymerized, and then 930 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 3,700 and the content of the 1,4-bond structural units as determined by $^1$H-NMR measurement was 19% by mole.

Next, 141.3 g of butadiene was added to the reaction liquid to carry out a polymerization reaction at 50° C. for 2 hours. The number average molecular weight (Mn) of the polybutadiene block (b2) of the block copolymer (structure: A-b1-b2) sampled at this point was 29,800, and the content of the 1,4-bond structural units as determined by $^1$H-NMR measurement was 60% by mole.

Subsequently, to this polymerization reaction solution was added 12.2 ml of dichlorodimethylsilane (a 0.5 M toluene solution), and the mixture was stirred at 50° C. for 1 hour to obtain a poly(α-methylstyrene)-polybutadiene-poly(α-methylstyrene) triblock copolymer. The coupling efficiency at this point was calculated from the ratio between the UV absorption area in GPC carried out on the coupled product (poly(α-methylstyrene)-polybutadiene-poly(α-methylstyrene) triblock copolymer: A-b1-b2-X-b2-b1-A, wherein X represents a residue of the coupling agent (—Si (Me$_2$)—), a number average molecular weight (Mn)=81,000) and the UV absorption area in GPC carried out on the unreacted block copolymer (poly(α-methylstyrene)-polybutadiene block copolymer: A-b1-b2, a number average molecular weight (Mn)=41,000), and the coupling efficiency was 94% by mass. Further, the results of $^1$H-NMR analysis show that the content of the poly(α-methylstyrene) blocks in the poly(α-methylstyrene)-polybutadiene-poly(α-methylstyrene) triblock copolymer was 30% by mass and the content of the 1,4-bond structural units in the polybutadiene block (the polymer block (B)) as a whole, that is, the blocks (131) and (b2) was 60% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly(α-methylstyrene)-polybutadiene-poly(α-methylstyrene) triblock copolymer [hereinafter abbreviated as a block copolymer (I)-1].

The obtained block copolymer (I)-1 was subjected to GPC measurement and the results thereof show that the main component was the hydrogenated product (coupled product) of the poly(α-methylstyrene)-polybutadiene-poly(α-methylstyrene) triblock copolymer having a peak top molecular weight (Mt)=81,000, a number average molecular weight (Mn)=78,700, a weight average molecular weight (Mw)=79,500, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Production Example 2

Production of Block Copolymer (I)-2

A pressure container equipped with a stirrer, which had been purged with nitrogen, was charged with 90.9 g of α-methylstyrene, 138 g of cyclohexane, 15.2 g of methylcyclohexane, and 8.0 g of tetrahydrofuran. To the mixed liquid was added 9.1 ml of sec-butyl lithium (a 1.3 M cyclohexane solution), and the mixture was subjected to polymerization at −10° C. for 3 hours to form a polymer block (A). The number average molecular weight (Mn) of poly(α-methylstyrene) (polymer block (A)) after 3 hours from polymerization initiation was 6,600 and the polymerization conversion ratio of α-methylstyrene was 89%.

Subsequently, 81 g of butadiene was added to the reaction mixed liquid, the mixture was stirred at −10° C. for 30 minutes and polymerized, and then 2,600 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 9,500 and the content of the 1,4-bond structural units as determined by $^1$H-NMR measurement was 19% by mole.

Next, 460 g of butadiene was added to the reaction liquid to carry out a polymerization reaction at 50° C. for 2 hours. The number average molecular weight (Mn) of the polybutadiene block (b2) of the block copolymer (structure: A-b 1-b2) sampled at this point was 85,000, and the content of the 1,4-bond structural units as determined by $^1$H-NMR measurement was 60% by mole.

Subsequently, to this polymerization reaction solution was added 11.5 ml of dichlorodimethylsilane (a 0.5 M toluene solution), and the mixture was stirred at 50° C. for 1 hour to obtain a poly(α-methylstyrene)-polybutadiene-poly(α-methylstyrene) triblock copolymer. The coupling efficiency at this point was calculated from the ratio between the UV absorption area in GPC carried out on the coupled product [poly(α-methylstyrene)-polybutadiene-poly(α-methylstyrene) triblock copolymer: A-b1-b2-X-b2-b1-A, wherein X represents a residue of the coupling agent (—Si(Me$_2$)—), a number average molecular weight (Mn)=210,000] and the UV absorption area in GPC carried out on the unreacted block copolymer [poly(α-methylstyrene)-polybutadiene block copolymer: A-b1-b2, a number average molecular weight (Mn)=101,000], and the coupling efficiency was 94% by mass. Further, the results of $^1$H-NMR analysis show that the content of the poly(α-methylstyrene) blocks in the poly(α-methylstyrene)-polybutadiene-poly(α-methylstyrene) triblock copolymer was 13% by mass and the content of the 1,4-bond structural units in the polybutadiene block (the polymer block (B)) as a whole, that is, the blocks (b1) and (b2) was 56% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly(α-methylstyrene)-polybutadiene-poly(α-methylstyrene) triblock copolymer [hereinafter abbreviated as a block copolymer (I)-2].

The obtained block copolymer (I)-2 was subjected to GPC measurement and the results thereof show that the main component was the hydrogenated product (coupled product) of the poly(α-methylstyrene)-polybutadiene-poly(α-methylstyrene) triblock copolymer having a peak top molecular weight (Mt)=200,300, a number average molecular weight (Mn)=197,000, a weight average molecular weight (Mw)=199,000, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Production Example 3

Production of Block Copolymer (I')-3
(Comparative)

A pressure container equipped with a stirrer, which had been purged with nitrogen, was charged with 90.9 g of α-methylstyrene, 138 g of cyclohexane, 15.2 g of methylcyclohexane, and 3.1 g of tetrahydrofuran. To the mixed liquid was added 2.35 ml of sec-butyl lithium (a 1.3 M cyclohexane solution), and the mixture was subjected to polymerization at −10° C. for 3 hours to form a polymer block (A). The number average molecular weight (Mn) of poly(α-methylstyrene) (polymer block (A)) after 3 hours from polymerization initiation was 30,000 and the polymerization conversion ratio of α-methylstyrene was 89%.

Subsequently, 28 g of butadiene was added to the reaction mixed liquid, the mixture was stirred at −10° C. for 30 minutes and polymerized, and then 930 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 14,700 and the content of the 1,4-bond structural units as determined by $^1$H-NMR measurement was 19% by mole.

Next, 141.3 g of butadiene was added to the reaction liquid to carry out a polymerization reaction at 50° C. for 2 hours. The number average molecular weight (Mn) of the polybutadiene block (b2) of the block copolymer (structure: A-b1-b2) sampled at this point was 102,000, and the content of the 1,4-bond structural units as determined by $^1$H-NMR measurement was 60% by mole.

Subsequently, to this polymerization reaction solution was added 2.9 ml of dichlorodimethylsilane (a 0.5 M toluene solution), and the mixture was stirred at 50° C. for 1 hour to obtain a poly(α-methylstyrene)-polybutadiene-poly(α-methylstyrene) triblock copolymer. The coupling efficiency at this point was calculated from the ratio between the UV absorption area in GPC carried out on the coupled product [poly(α-methylstyrene)-polybutadiene-poly(α-methylstyrene) triblock copolymer: A-b1-b2-X-b2-b1-A, wherein X represents a residue of the coupling agent (—Si(Me$_2$)—), a number average molecular weight (Mn)=322,000] and the UV absorption area in GPC carried out on the unreacted block copolymer [poly(α-methylstyrene)-polybutadiene block copolymer: A-b1-b2, a number average molecular weight (Mn)=154,000], and the coupling efficiency was 94% by mass. Further, the results of $^1$H-NMR analysis show that the content of the poly(α-methylstyrene) blocks in the poly(α-methylstyrene)-polybutadiene-poly(α-methylstyrene) triblock copolymer was 30% by mass and the content of the 1,4-bond structural units in the polybutadiene block (the polymer block (B)) as a whole, that is, the blocks (b1) and (b2) was 56% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly(α-methylstyrene)-polybutadiene-poly(α-methylstyrene) triblock copolymer [hereinafter abbreviated as a block copolymer (I')-3].

The obtained block copolymer (I')-3 was subjected to GPC measurement and the results thereof show that the main component was the hydrogenated product (coupled product) of the poly(α-methylstyrene)-polybutadiene-poly(α-methylstyrene) triblock copolymer having a peak top molecular weight (Mt)=320,000, number average molecular weight (Mn)=317,000, weight average molecular weight (Mw)=318,500, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Production Example 4

Production of Block Copolymer (I)-4

A pressure container equipped with a stirrer, which had been purged with nitrogen, was charged with 90.9 g of α-methylstyrene, 138 g of cyclohexane, 15.2 g of methylcyclohexane, and 5.7 g of tetrahydrofuran. To the mixed liquid was added 9.4 ml of sec-butyl lithium (a 1.3 M cyclohexane solution), and the mixture was subjected to polymerization at −10° C. for 3 hours to form a polymer block (A). The number average molecular weight (Mn) of poly(α-methylstyrene) (polymer block (A)) after 3 hours from polymerization initiation was 6,600 and the polymerization conversion ratio of α-methylstyrene was 89%.

Subsequently, 23 g of butadiene was added to the reaction mixed liquid, the mixture was stirred at −10° C. for 50 minutes and polymerized, and then 930 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 3,700 and the content of the 1,4-bond structural units as determined by $^1$H-NMR measurement was 19% by mole.

Next, 141.3 g of butadiene was added to the reaction liquid to carry out a polymerization reaction at 50° C. for 2 hours. The number average molecular weight (Mn) of the polybutadiene block (b2) of the block copolymer (structure: A-b1-b2) sampled at this point was 29,800, and the content of the 1,4-bond structural units as determined by $^1$H-NMR measurement was 40% by mole.

Subsequently, to this polymerization reaction solution was added 12.2 ml of dichlorodimethylsilane (a 0.5 M toluene solution), and the mixture was stirred at 50° C. for 1 hour to obtain a poly(α-methylstyrene)-polybutadiene-poly(α-methylstyrene) triblock copolymer. The coupling efficiency at this point was calculated from the ratio between the UV absorption area in GPC carried out on the coupled product [poly(α-methylstyrene)-polybutadiene-poly(α-methylstyrene) triblock copolymer: A-b1-b2-X-b2-b1-A, wherein X represents a residue of the coupling agent (—Si(Me$_2$)—), a number average molecular weight (Mn)=81,000] and the UV absorption area in GPC carried out on the unreacted block copolymer [poly(α-methylstyrene)-polybutadiene block copolymer: A-b1-b2, a number average molecular weight (Mn)=41,000], and the coupling efficiency was 94% by mass. Further, the results of $^1$H-NMR analysis show that the content of the poly(α-methylstyrene) blocks in the poly(α-methylstyrene)-polybutadiene-poly(α-methylstyrene) triblock copolymer was 30% by mass and the content of the 1,4-bond structural units in the polybutadiene block (the polymer block (B)) as a whole, that is, the blocks (b1) and (b2) was 34% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly(α-methylstyrene)-polybutadiene-poly(α-methylstyrene) triblock copolymer [hereinafter abbreviated as a block copolymer (I)-4].

The obtained block copolymer (I)-4 was subjected to GPC measurement and the results thereof show that the main component was the hydrogenated product (coupled product) of the poly(α-methylstyrene)-polybutadiene-poly(α-methylstyrene) triblock copolymer having a peak top molecular weight (Mt)=81,000, number average molecular weight (Mn)=78,700, weight average molecular weight (Mw)=79,500, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Production Example 5

Production of Block Copolymer (I')-5
(Comparative)

A pressure container equipped with a stirrer was charged with 2,500 g of cyclohexane, 6.0 g of tetrahydrofuran, 100 g of styrene, and 9.0 g of sec-butyl lithium (a 1.3 M cyclohexane solution), and the mixture was subjected to polymerization at 60° C. for 60 minutes. Then, 420 g of butadiene was added thereto to carry out polymerization for 60 minutes, and 100 g of styrene was further added to the mixture to carry out polymerization for 60 minutes. Then, finally, methanol was added to the mixture to stop the reaction, thereby synthesizing a "styrene-butadiene-styrene" type block copolymer. The obtained block copolymer was hydrogenated by the same method as in Production Example 1 above to obtain a hydrogenated product of the block copolymer.

The obtained hydrogenated block copolymer was subjected to GPC measurement and the results show: a peak top molecular weight (Mt) of the main component=164,000, a number average molecular weight (Mn)=160,000, a weight average molecular weight (Mw)=161,000, and Mw/Mn=1.01. Further, the number average molecular weight (Mn) of the polystyrene block (A') was 146,000. In addition, the results of $^1$H-NMR analysis show that the content of the polystyrene blocks in the polystyrene triblock copolymer was 30% by mass, the amount of the 1,4-bonds in the poly(isoprene/butadiene) block was 60% by mole, and the hydrogen addition rate was 98%.

Production Example 6

Production of Block Copolymer (I)-6

A pressure container equipped with a stirrer, which had been purged with nitrogen, was charged with 180 g of α-methylstyrene, 138 g of cyclohexane, 15.2 g of methylcyclohexane, and 3.2 g of tetrahydrofuran. To the mixed liquid was added 5.8 ml of sec-butyl lithium (a 1.3 M cyclohexane solution), and the mixture was subjected to polymerization at −10° C. for 3 hours to form a polymer block (A). The number average molecular weight (Mn) of poly-α-methylstyrene (polymer block (A)) after 3 hours from polymerization initiation was 13,200 and the polymerization conversion ratio of α-methylstyrene was 89%.

Subsequently, 18 g of butadiene was added to the reaction mixed liquid, the mixture was stirred at −10° C. for 30 minutes and polymerized, and then 930 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 3,700 and the content of the 1,4-bond structural units as determined by $^1$H-NMR measurement was 19% by mole.

Next, 88 g of butadiene was added to the reaction liquid to carry out a polymerization reaction at 50° C. for 2 hours. The number average molecular weight (Mn) of the polybutadiene block (b2) of the block copolymer (structure: A-b1-b2) sampled at this point was 23,000, and the content of the 1,4-bond structural units as determined by $^1$H-NMR measurement was 60% by mole.

Subsequently, to this polymerization reaction solution was added 7.2 ml of dichlorodimethylsilane (a 0.5 M toluene solution), and the mixture was stirred at 50° C. for 1 hour to obtain a poly-α-methylstyrene-polybutadiene-poly-α-methylstyrene triblock copolymer. The coupling efficiency at this point was calculated from the ratio between the UV absorption area in GPC carried out on the coupled product (poly-α-methylstyrene-polybutadiene-poly-α-methylstyrene triblock copolymer: A-b1-b2-X-b2-b1-A, wherein X represents a residue of the coupling agent (—Si(Me$_2$)—), a number average molecular weight (Mn)=81,000) and the UV absorption area in GPC carried out on the unreacted block copolymer (poly-α-methylstyrene-polybutadiene block copolymer: A-b1-b2, a number average molecular weight (Mn)=40,000), and the coupling efficiency was 94% by mass. Further, the results of $^1$H-NMR analysis show that the content of the poly-α-methylstyrene blocks in the poly-α-methylstyrene-polybutadiene-poly-α-methylstyrene triblock copolymer was 60% by mass and the content of the 1,4-bond structural units in the polybutadiene block (the polymer block (B)) as a whole, that is, the blocks (b1) and (b2) was 56% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly(α-methylstyrene)-polybutadiene-poly(α-methylstyrene) triblock copolymer [hereinafter abbreviated as a block copolymer (I)-6].

The obtained block copolymer (I)-6 was subjected to GPC measurement and the results thereof show that the main component was the hydrogenated product (coupled product) of the poly-α-methylstyrene-polybutadiene-poly-α-methylstyrene triblock copolymer having a peak top molecular weight (Mt)=81,000, number average molecular weight (Mn)=79,000, weight average molecular weight (Mw)=79,500, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Production Example 7

Production of Block Copolymer (I)-7

A pressure container equipped with a stirrer, which had been purged with nitrogen, was charged with 90.9 g of α-methylstyrene, 138 g of cyclohexane, 15.2 g of methylcyclohexane, and 3.2 g of tetrahydrofuran. To the mixed liquid was added 5.8 ml of sec-butyl lithium (a 1.3 M cyclohexane solution), and the mixture was subjected to polymerization at −10° C. for 3 hours to form a polymer block (A). The number average molecular weight (Mn) of poly-α-methylstyrene (polymer block (A)) after 3 hours from polymerization initiation was 10,600 and the polymerization conversion ratio of α-methylstyrene was 89%.

Subsequently, 23 g of butadiene was added to the reaction mixed liquid, the mixture was stirred at −10° C. for 30 minutes and polymerized, and then 930 g of cyclohexane was added thereto. The polymerization conversion ratio of α-methylstyrene at this point was 89%. The number average molecular weight (GPC measurement, relative to polystyrene as a standard) of the polybutadiene block (b1) thus formed was 4,800 and the content of the 1,4-bond structural units as determined by $^1$H-NMR measurement was 19% by mole.

Next, 141.3 g of butadiene was added to the reaction liquid to carry out a polymerization reaction at 50° C. for 2 hours. The number average molecular weight (Mn) of the polybutadiene block (b2) of the block copolymer (structure: A-b1-b2) sampled at this point was 39,700, and the content of the 1,4-bond structural units as determined by $^1$H-NMR measurement was 60% by mole.

Subsequently, to this polymerization reaction solution was added 7.2 ml of dichlorodimethylsilane (a 0.5 M toluene solution), and the mixture was stirred at 50° C. for 1 hour to obtain a poly-α-methylstyrene-polybutadiene-poly-α-methylstyrene triblock copolymer. The coupling efficiency at this point was calculated from the ratio between the UV absorption area in GPC carried out on the coupled product (poly-α-methylstyrene-polybutadiene-poly-α-methylstyrene triblock copolymer: A-b1-b2-X-b2-b1-A, wherein X represents a residue of the coupling agent (—Si(Me$_2$)—), a number average molecular weight (Mn)=122,000) and the UV absorption area in GPC carried out on the unreacted block copolymer (poly-α-methylstyrene-polybutadiene block copolymer: A-b1-b2, a number average molecular weight (Mn)=55,300), and the coupling efficiency was 94% by mass. Further, the results of $^1$H-NMR analysis show that the content of the poly-α-methylstyrene blocks in the poly-α-methylstyrene-polybutadiene-poly-α-methylstyrene triblock copolymer was 30% by mass and the content of the 1,4-bond structural units in the polybutadiene block (the polymer block (B)) as a whole, that is, the blocks (b1) and (b2) was 56% by mole.

A Ziegler type hydrogen addition catalyst formed from nickel octylate and triethylaluminum was added to the obtained polymerization reaction solution in a hydrogen atmosphere, and a hydrogen addition reaction was carried out at a hydrogen pressure of 0.8 MPa and 80° C. for 5 hours to obtain a hydrogenated product of the poly-α-methylstyrene-polybutadiene-poly-α-methylstyrene triblock copolymer [hereinafter abbreviated as a block copolymer (I)-7].

The obtained block copolymer (I)-7 was subjected to GPC measurement and the results thereof show that the main component was the hydrogenated product (coupled product) of the poly-α-methylstyrene-polybutadiene-poly-α-methylstyrene triblock copolymer having a number average molecular weight (Mn)=110,000, a weight average molecular weight (Mw)=111,000, and Mw/Mn=1.01, and that the coupled product was contained in an amount of 94% by mass as determined from the ratio of UV (254 nm) absorption areas in GPC. Further, the hydrogen addition ratio of the polybutadiene block (the polymer block (B)) containing the blocks (b1) and (b2) was 97% by mole as determined by $^1$H-NMR measurement.

Here, the physical properties of the block copolymers obtained in Production Examples 1 to 7 are summarized in Table 1 below.

TABLE 1

|  |  | Block copolymer (I) | Structure | Number average molecular weight (Mn) | Hydrogenation rate (% by mole) | Amount of 1,4-bonds (% by mole) | Amount*[1] (% by mole) of polymer block (A) |
|---|---|---|---|---|---|---|---|
| Production | 1 | (I)-1 | mS-EB-mS | 78,700 | 97 | 60 | 30 |
| Example | 2 | (I)-2 | mS-EB-mS | 197,000 | 97 | 56 | 13 |
|  | 3 | (I')-3 | mS-EB-mS | 317,000 | 97 | 56 | 30 |

TABLE 1-continued

|   | Block copolymer (I) | Structure | Number average molecular weight (Mn) | Hydrogenation rate (% by mole) | Amount of 1,4-bonds (% by mole) | Amount*[1] (% by mole) of polymer block (A) |
|---|---|---|---|---|---|---|
| 4 | (I)-4 | mS-EB-mS | 78,700 | 97 | 34 | 30 |
| 5 | (I')-5 | S-EB-S | 160,000 | 98 | 60 | 30 |
| 6 | (I)-6 | mS-EB-mS | 79,000 | 97 | 56 | 60 |
| 7 | (I)-7 | mS-EB-mS | 110,000 | 97 | 56 | 30 |

<Abbreviations in Description of Structures>
Polymer block (A)
mS: Poly(α-methylstyrene) block
S: Polystyrene block
Polymer block (B)
EB: Hydrogenated polybutadiene block
*[1]For the block copolymer (I')-5, the content of the polystyrene blocks.

[Acryl-Based Polymer (II)]
((II)-1)
"PARAPET (registered trademark) GH-S" (methacryl resin, MFR=10 g/10 minutes (measured in accordance with ISO 1133. Conditions: 230° C., 37.3 N), manufactured by Kuraray Co., Ltd.)
((II)-2)
500 g of pure water was put into a 1000 ml three-necked flask equipped with a reflux condenser, and the atmosphere inside the flask was thoroughly purged with nitrogen. Subsequently, a mixed solution of 425 g methyl methacrylate, 55 g of methyl acrylate, 2.5 g of lauryl peroxide, and 4 g of lauryl mercaptan was introduced thereinto to carry out polymerization at 80° C. for 4 hours, thereby obtaining an acryl-based polymer (which is hereinafter referred to as an "acryl-based polymer (II)-2"). Further, the intrinsic viscosity of the obtained acryl-based polymer (II)-2 in chloroform at 20° C. was 0.301 dl/g. The obtained acryl-based resin had an MFR=35 g/10 minutes (measured in accordance with ISO 1133. Conditions: 230° C., 37.3 N).

[Softening Agent (III)]
((III)-1)
"DIANA PROCESS OIL PW-380" (dynamic viscosity (40° C.)=386.1 mm$^2$/s, paraffin-based process oil manufactured by Idemitsu Kosan Co., Ltd.)

Examples 1 to 14 and Comparative Examples 1 to 4

The respective components were preliminarily blended at the mass ratios shown in Tables 2 to 4, using Super Mixer "SMV-100" (manufactured by Kawata Mfg. Co., Ltd.), and then melt-kneaded under the conditions of 230° C. and a screw rotation speed of 200 rpm, using a twin screw extruder "TEM-35B" (manufactured by Toshiba Machine Co., Ltd.), from which strand forms were extruded and cut to obtain a thermoplastic polymer composition in the form of a pellet. The hardness, the specific gravity, and the melt flow rate of the thermoplastic polymer composition were measured in the following manner. The results are shown in Table 2.

Furthermore, the pellet of the thermoplastic polymer composition thus obtained was connected to a single screw extruder "GM30" [(GM Sansho Co., Ltd.; a cylinder temperature of 240° C., a die head temperature of 230° C., a screw speed of 46 rpm, a cast roll temperature of 90° C., and use of a screen mesh of 100 meshes], and a film molding device with or without a static mixer having 8 elements to prepare a film with a thickness of 200 µm by a T die method. The physical properties of the film were measured in the following manner. The results are shown in Tables 2 to 4.

Figure 2:
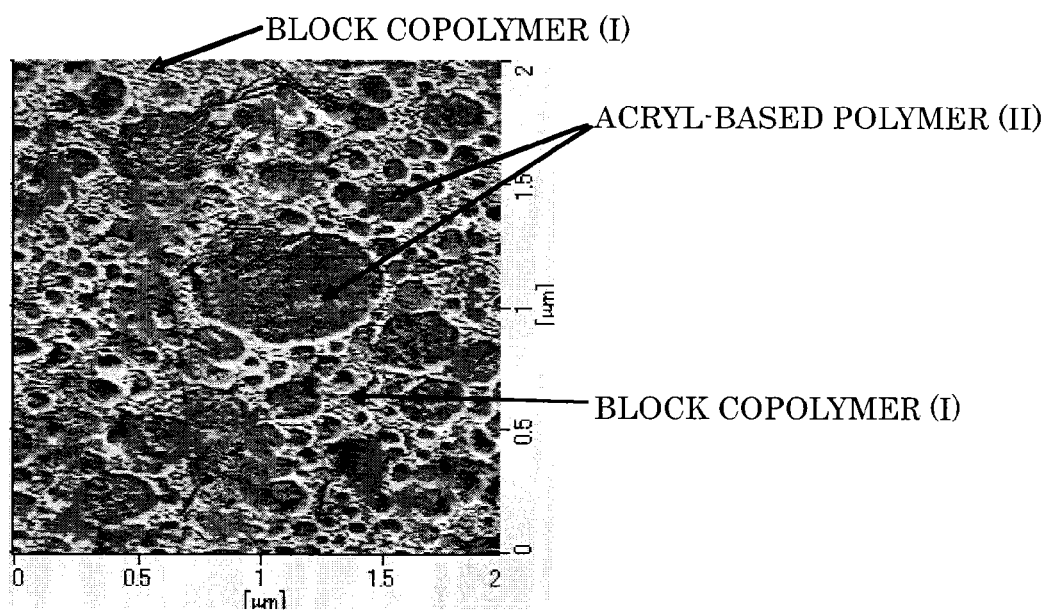
FIG. 2 is an image of the phase structure of a film produced using the thermoplastic polymer composition (B-2) obtained in Comparative Example 2, as observed by scanning probe microscopy (SPM).

In addition, for the films prepared using the thermoplastic polymer composition (A-1) obtained in Example 1 and the thermoplastic polymer composition (B-2) obtained in Comparative Example 2, the phase structures (morphology) were observed by scanning probe microscopy (SPM) according to the following method. The obtained images are shown in FIGS. 1 and 2.

(1) Hardness
A sheet with a thickness of 2 mm was obtained by carrying out press molding at 230° C., and the sheet was used to measure the hardness at a measurement temperature of 23° C. by a method in accordance with ISO 48.

(2) Specific Gravity
The specific gravity was measured by an immersion method using a press sheet by a method in accordance with ISO 1183.

(3) Measurement of Melt Flow Rate (MFR)
The MFR (g/10 minutes) of the pellet of the thermoplastic polymer composition was measured under the conditions of 230° C. and a load of 2.16 kg (21.18 N) by a method in accordance with ISO 1133, and used as an index for the mold processability. As the value of MFR is higher, the mold processability is superior. If the MFR is approximately 2 to 50, the mold processability is excellent.

(4) Measurement of Average Dispersed Particle Diameter of Acryl-Based Polymer (II)
A sample kept in the frozen state using liquid nitrogen was cut in cross-section in the direction perpendicular to the MD direction using a razor from the vicinity of the surface of the film prepared by the above method. The long diameter of the dispersed particles was measured with a ruler when observed with a scanning probe microscope "Probe Station SPI 4000/Environment Controllable Unit E-Sweep" (manufactured by SII Nano Technology Co., Ltd.), and an average value taken from 100 values obtained by dividing the length by the micrograph magnification, thereby determining the average dispersed particle diameter of the acryl-based polymer (II).

(5) Measurement of Proportion of Dispersed Particles Having Dispersed Particle Diameter of 40 nm or More and Less than 60 nm
For the average dispersed particle diameter of the acryl-based polymer (II), the long diameter of the dispersed particles that can be observed with a scanning probe microscope "Probe Station SPI 4000/Environment Controllable Unit E-Sweep" (manufactured by SII Nano Technology Co., Ltd.) was measured with a ruler, and the number of the particles having a dispersed particle diameter of 40 nm or more and less than 60 nm among the values obtained by dividing the length by the micrograph magnification was divided by the number of all the particles.

The following measurement was carried out using a film with a thickness of 200 μm.

(6) Evaluation of Ease of Coating (Difficulty in Peeling of Coating Film)

The film obtained in Examples above was cut to a dimension of 110 mm×110 mm×200 μm in thickness, and a urethane-based paint "TAKELAC E-550" (trade name, a 2-component polyurethanepolyol, manufactured by Mitsui Takeda Chemicals Inc.) was applied thereonto. This was left to stand in a thermostat at 80° C. for 2 hours, thereby curing the paint, and then left to stand under two types of environmental conditions of a normal environment (25° C., a humidity of 50%) and a high-temperature and high-humidity environment (50° C., a humidity of 95%) for 72 hours. A peeling test of the coating film according to a cross-cut tape method was carried out to count the meshes. More meshes remaining while not peeled indicate higher ease of coating.

Incidentally, the cross-cut tape method refers to a method in which grid meshes (25 meshes with four 2 mm sides) penetrating a coating film to reach a base material are placed, a cellophane tape is attached thereto, and after the tape is detached, the number of the remaining meshes on the base material is counted. The number of the meshes remaining on the film material without peeling of 25 indicates best ease of coating while not involving peeling at all.

(7) Measurement of Haze

In accordance with JIS K 7105, a haze was measured by a turbidity/haze meter "HR-100" (manufactured by Murakami Color Research Laboratory Co., Ltd.). As the value is lower, the transparency is superior, and thus, a value targeted by the present invention is 1.4 or less.

(8) Measurement of Thrust Strength

In accordance with JIS Z 1707, a needle having a diameter of 1 mm and a tip radius of 0.5 mm was thrust into a sheet with a thickness of 200 μm at a speed of 50 mm/min, and the thrust strength at a time of needle penetration was measured by a tensile tester "5566" (manufactured by Instron Corporation). As the value is higher, the thrust strength is superior.

(9) and (10) Measurement of Tensile Strength (Tb) and Elongation at Break (Eb)

A Type 5 specimen in accordance with ISO 37 was punched out from a sheet with a thickness of 200 μm. For the obtained specimen, a tensile test was carried out under the conditions of 23° C. and a tensile speed of 500 mm/min to measure the tensile strength (MPa) and the elongation at break (%).

(11) Observation of Phase Structure (Morphology)

A sample kept in the frozen state using liquid nitrogen was cut in cross-section in the direction perpendicular to the MD direction using a razor from the vicinity of the surface of the film prepared by the above method. The phase structure (morphology) of the sample thus prepared was observed using a scanning probe microscope "Probe Station SPI 4000/Environment Controllable Unit E-Sweep" (manufactured by SII Nano Technology Co., Ltd.). The observation was carried out in a phase mode in a scan size in the range of 5 μm×5 μm at normal temperature and normal pressure.

TABLE 2

| | | Example | | | | | | | | |
|---|---|---|---|---|---|---|---|---|---|---|
| | Component | 1 | 2 | 3 | 4 | 5 | 6 | 7 | 8 | 9 |
| (I) | Block copolymer (I)-1 | 50 | 50 | 50 | 50 | | | 50 | 47 | 50 |
| | Block copolymer (I)-2 | | | | | 50 | | | | |
| | Block copolymer (I')-3 | | | | | | 50 | | | |
| | Block copolymer (I)-4 | | | | | | | | | |
| | Block copolymer (I')-5 | | | | | | | | | |
| | Block copolymer (I)-6 | | | | | | | | | |
| | Block copolymer (I)-7 | | | | | | | | | |
| (II) | Acryl-based polymer (II)-1 | 50 | 50 | 50 | 50 | 50 | 50 | | 47 | 32 |
| | Acryl-based polymer (II)-2 | | | | | | | 50 | | |
| (III) | Softening agent (III)-1 | | | | | | | | 6 | 18 |
| Molding device | Static mixer*[2] | A | A | A | A | A | A | A | A | A |
| | Number of elements | 8 | 4 | 16 | 8 | 8 | 8 | 8 | 8 | 8 |
| | Number of meshes in screen mesh | 100 | 100 | 100 | 200 | 100 | 100 | 100 | 100 | 100 |
| Symbols of polymer composition | | A-1 | A-2 | A-3 | A-4 | A-5 | A-6 | A-7 | A-8 | A-9 |
| Physical properties-characteristics | (1) Hardness (Shore A) | 87 | 87 | 87 | 89 | 75 | 80 | 87 | 80 | 60 |
| | (2) Specific gravity (g/cm$^3$) | 1.04 | 1.04 | 1.04 | 1.04 | 1.02 | 1.04 | 1.04 | 1.02 | 0.99 |
| | (3) Melt flow rate (g/10 minutes) | 2.4 | 2.4 | 2.4 | 2.4 | 0.7 | 15 | 20 | 4.0 | 30 |
| | (4) Average dispersed particle diameter (nm) of acryl-based polymer (II) | 97 | 110 | 95 | 111 | 96 | 88 | 85 | 82 | 85 |
| | (5) Ratio (%) of dispersed particles having a dispersed particle diameter of 40 nm or more and less than 60 nm | 44 | 35 | 46 | 36 | 47 | 52 | 57 | 56 | 50 |
| | (6) Ease of coating (number of meshes) | | | | | | | | | |
| | Normal environment (25° C., 50%) | 25 | — | — | — | 25 | 25 | 25 | — | — |
| | High-temperature and high-humidity environment (50° C., 95%) | 25 | — | — | — | 25 | 25 | 25 | — | — |
| | (7) Haze (%) | 1.1 | 1.4 | 1.1 | 1.4 | 1 | 0.8 | 0.7 | 0.7 | 0.8 |
| | (8) Thrust strength (N) | 24.9 | 23.0 | 24.4 | 22.0 | 21.4 | 23.8 | 23.0 | 19.4 | 22.4 |
| | (9) Tensile strength (MPa) | 50.0 | 49.1 | 50.0 | 48.0 | 42.9 | 47.7 | 46.1 | 39.0 | 45.0 |
| | (10) Elongation at break (%) | 300 | 300 | 300 | 300 | 400 | 400 | 300 | 310 | 490 |

*[2]A = Static mixer included. B = Static mixer not included.

TABLE 3

| | Component | Example 10 | Example 11 | Example 12 | Example 13 | Example 14 |
|---|---|---|---|---|---|---|
| (I) | Block copolymer (I)-1 | 66.7 | 40 | 35.7 | | |
| | Block copolymer (I)-2 | | | | | |
| | Block copolymer (I')-3 | | | | | |
| | Block copolymer (I)-4 | | | | | |
| | Block copolymer (I')-5 | | | | 50 | |
| | Block copolymer (I)-6 | | | | | |
| | Block copolymer (I)-7 | | | | | 50 |
| (II) | Acryl-based polymer (II)-1 | 33.3 | 60 | 64.3 | 50 | 50 |
| | Acryl-based polymer (II)-2 | | | | | |
| (III) | Softening agent (III)-1 | | | | | |
| Molding device | Static mixer*[2] | A | A | A | A | A |
| | Number of elements | 8 | 8 | 8 | 8 | 8 |
| | Number of meshes in screen mesh | 100 | 100 | 100 | 100 | 100 |
| Symbols of polymer composition | | A-10 | A-11 | A-12 | A-13 | A-14 |
| physical properties-characteristics | (1) Hardness (Shore A) | 80 | 91 | 93 | 99 | 87 |
| | (2) Specific gravity (g/cm$^3$) | 1.02 | 1.09 | 1.10 | 1.04 | 1.04 |
| | (3) Melt flow rate (g/10 minutes) | 3.4 | 1.8 | 1.5 | 1.7 | 1.6 |
| | (4) Average dispersed particle diameter (nm) of acryl-based polymer (II) | 83 | 109 | 113 | 90 | 108 |
| | (5) Ratio (%) of dispersed particles having a dispersed particle diameter of 40 nm or more and less than 60 nm | 41 | 40 | 32 | 47 | 41 |
| | (6) Ease of coating (number of meshes) | | | | | |
| | Normal environment (25° C., 50%) | 23 | 25 | 25 | 25 | 25 |
| | High-temperature and high-humidity environment (50° C., 95%) | 22 | 25 | 25 | 25 | 25 |
| | (7) Haze (%) | 1.2 | 0.7 | 0.7 | 1.0 | 1.1 |
| | (8) Thrust strength (N) | 22 | 29 | 32 | 27 | 24 |
| | (9) Tensile strength (MPa) | 47 | 55 | 57 | 56 | 51 |
| | (10) Elongation at break (%) | 400 | 260 | 200 | 230 | 280 |

*[2] A = Static mixer included. B = Static mixer not included.

TABLE 4

| | Component | Comparative Example 1 | Comparative Example 2 | Comparative Example 3 | Comparative Example 4 |
|---|---|---|---|---|---|
| (I) | Block copolymer (I)-1 | | 50 | | |
| | Block copolymer (I)-2 | | | | |
| | Block copolymer (I')-3 | 50 | | | |
| | Block copolymer (I)-4 | | | | |
| | Block copolymer (I')-5 | | | 50 | 50 |
| | Block copolymer (I)-6 | | | | |
| | Block copolymer (I)-7 | | | | |
| (II) | Acryl-based polymer (II)-1 | 50 | 50 | 50 | 50 |
| | Acryl-based polymer (II)-2 | | | | |
| (III) | Softening agent (III)-1 | | | | |
| Molding device | Static mixer*[2] | A | B | A | B |
| | Number of elements | 8 | — | 8 | — |
| | Number of meshes in screen mesh | 100 | 100 | 100 | 100 |
| | Symbols of polymer composition | B-1 | B-2 | B-3 | B-4 |
| Physical properties-characteristics | (1) Hardness (Shore A) | 86 | 87 | 87 | 87 |
| | (2) Specific gravity (g/cm$^3$) | 1.04 | 1.04 | 1.04 | 1.04 |
| | (3) Melt flow rate (g/10 minutes) | 0.1 | 2.4 | 0.9 | 0.9 |
| | (4) Average dispersed particle diameter (nm) of acryl-based polymer (II) | 250 | 119 | 220 | 300 |
| | (5) Ratio (%) of dispersed particles having a dispersed particle diameter of 40 nm or more and less than 60 nm | 10 | 11.1 | 13 | 6 |
| | (6) Ease of coating (number of meshes) | | | | |
| | Normal environment (25° C., 50%) | — | 25 | 20 | 19 |
| | High-temperature and high-humidity environment (50° C., 95%) | — | 23 | 18 | 16 |
| | (7) Haze (%) | 5 | 1.5 | 4 | 6 |
| | (8) Thrust strength (N) | 19.0 | 19.9 | 12.7 | 9.0 |
| | (9) Tensile strength (MPa) | 38.2 | 48.2 | 25.4 | 18.0 |
| | (10) Elongation at break (%) | 150 | 250 | 300 | 160 |

*[2] A = Static mixer included. B = Static mixer not included.

From Tables 2 to 4, it can be seen that the thermoplastic polymer compositions and sheets or films thereof in Examples 1 to 14 have both good flexibility and rubber elasticity, and have both high transparency and excellent mechanical properties. In addition, the thermoplastic resin compositions of Examples 1 to 14 are also excellent in mold processability, in addition to the above characteristics.

In the thermoplastic polymer composition of the present Example, the dispersed particles of the acryl polymer (II) were finely dispersed, as compared with the thermoplastic polymer compositions of Comparative Examples, and as a result, the compatibility with printing inks having polar groups, that is, the ease of coating, was usually further improved. In fact, the results of the evaluation of ease of coating were superior to those in Comparative Example.

On the other hand, in Comparative Example 1, in which the block copolymer (I')-3 having a too high number average molecular weight was used, the average dispersed particle diameter of the dispersed particles of the acryl-based polymer (II) was increased, and further, the ratio of the dispersed particles having a dispersed particle diameter of 40 nm or more and less than 60 nm was significantly reduced. Therefore, the transparency and the mechanical properties were evaluated to be deteriorated.

Furthermore, in Comparative Example 2, in which the molding device having no static mixer was used, the ratio of the dispersed particles having a dispersed particle diameter of 40 nm or more and less than 60 nm in the acryl-based polymer (II) was significantly reduced. Therefore, as compared with Example 1, the transparency was not at a satisfactory level, the ease of coating under a high-temperature and high-humidity environment was reduced, and thus, the mechanical properties were also slightly reduced. Further, in Comparative Example 3, in which the block copolymer (I')-5 having no α-methylstyrene unit was used, and Comparative Example 4, in which the block copolymer (I')-5 and the molding device having no static mixer were used, the average dispersed particle diameter of the dispersed particles of the acryl-based polymer (II) was increased, and further, the ratio of the dispersed particles having a dispersed particle diameter of 40 nm or more and less than 60 nm was significantly reduced. Therefore, the transparency was very poor and the mechanical properties (in particular, thrust strength) are also significantly low. In addition, in any of a normal environment and a high-temperature and high-humidity environment, the ease of coating was poor.

From FIG. 1, it can be seen that the film produced using the thermoplastic polymer composition obtained in Example 1 has a sea-island structure in which the block copolymer (I) forms a sea and the acryl-based polymer (II) forms an island, and further, the ratio of the dispersed particles having a dispersed particle diameter of 40 nm or more and less than 60 nm in the acryl-based polymer (II) is high. On the other hand, it is found that the film produced using the thermoplastic polymer composition obtained in Comparative Example 2 as shown in FIG. 2 has a large dispersed particle diameter of the acryl-based polymer (II) and does not have a fine dispersed structure as in the present invention.

Examples 15 to 19 and Comparative Examples 5 to 7

Multi-Layered Film

In Examples 15 to 19, the thermoplastic polymer composition (A-1), (A-5), or (A-6) obtained in Example 1, 5, or 6 was used as an intermediate layer, while in Comparative Examples 5 to 7, TPU, TPAE, or TPEE was used as an intermediate layer, so as to prepare a trilayer film provided with the top layer and the bottom layer shown in Table 5.

For the production of a trilayer film, the material of the intermediate layer in Table 5 was inserted between the materials of the top and bottom layers shown in Table 5 (overlapped area: 10 mm×10 mm), pre-heated at 150° C. for 4.5 minutes, and then compressed at a pressure of 2 MPa for 30 seconds.

Further, the top layer and the bottom layer are positioned for the sake of convenience in such a manner, and even the reverse position of the top and bottom layers also leads to a trilayer film.

The tensile shear adhesion strength of the trilayer film was measured by the following method. The results are shown in Table 5.

(12) Method for Measuring Tensile Shear Adhesion Strength

In accordance with JIS K 6850, the tensile shear adhesion strength of the trilayer film was measured. A higher numeral value thereof indicates higher adhesion strength. A numeral value of 0 indicates no adhesion of the respective layers.

TABLE 5

| | | Thickness | Example | | | | | Comparative Example | | |
|---|---|---|---|---|---|---|---|---|---|---|
| | Component | (μm) | 15 | 16 | 17 | 18 | 19 | 5 | 6 | 7 |
| Trilayer film | Top layer | 500 | PP | PP | PMMA | PP | PP | PP | PP | PP |
| | Intermediate layer | 200 | A-1 | A-1 | A-1 | A-5 | A-6 | TPU | TPAE | TPEE |
| | Bottom layer | 500 | PMMA | PP | PMMA | PMMA | PMMA | PMMA | PMMA | PMMA |
| (12) Tensile shear adhesion strength (N/mm$^2$) | | | 2.4 | 4.1 | 2.2 | 2.0 | 2.5 | 0 | 0 | 0 |

PMMA: "PARAPET (registered trademark) EH1000", methacryl-based resin, manufactured by Kuraray Co., Ltd.
PP: "Novatec (registered trademark) EG7F", olefin-based resin, manufactured by Japan Polypropylene Corporation
TPU: "Elastollan ET690", polyurethane-based thermoplastic elastomer, manufactured by BASF Japan, Ltd.
TPAE: "Pebax 4033-SP01", polyamide-based thermoplastic elastomer, manufactured by Arkema Inc.
TPEE: "Hytrel 4047", polyester-based thermoplastic elastomer, manufactured by Du Pont-Toray Co., Ltd.

According to Table 5, it can be seen that multi-layered films with the configurations of Examples 15 to 19 can provide sufficiently high tensile shear adhesion strength and high adhesion between the layers. From this, it is clarified that the thermoplastic polymer composition of the present invention has excellent adhesion with respect to a polar resin such as PMMA, and a multi-layered film with such resin can be suitably produced.

INDUSTRIAL APPLICABILITY

The thermoplastic polymer composition of the present invention can be effectively used in a wide range of applications such as, for example, automobile interior and exterior parts such as instrument panels, rack-and-pinion boots, suspension boots, constant velocity joint boots, bumpers, side moldings, weather strips, mud guards, emblems, leather seats, floor mats, arm rests, air bag covers, steering wheel covers, belt line moldings, flash mounts, gears, and knobs; hoses and tubes such as pressure hoses, fire hoses, hoses for coating, washing machine hoses, fuel tubes, oil hydraulic and pneumatic tubes, and tubes for dialysis; gripping materials for various products (for example, scissors, drivers, toothbrushes, pens, and cameras); home-appliance parts such as refrigerator gaskets, vacuum cleaner bumpers, cellular phone protection films, and waterproof bodies; business machine parts such as feeding rollers and winding rollers for copy machines; furniture such as sofa and chair sheets; parts such as switch covers, casters, stoppers, and leg rubber; construction materials such as coated steel plates and coated plywood; sporting goods such as swimming goggles, snorkels, ski sticks, ski boots, snowboard boots, ski or snowboard surface materials, golf ball covers, various shoes, and outer soles of shoes; medical supplies such as syringe gaskets and rolling tubes; industrial materials such as conveyer belts, electric belts, and pelletizer rolls; stretchable members of sanitary goods such as paper diapers, poultices, and bandages; band applications such as hair bands, wrist bands, watch bands, and eyeglass bands; and other goods such as snow chains, wire coating materials, trays, films, sheets, stationery, toys, and sundry goods.

The invention claimed is:

1. A thermoplastic polymer composition, comprising:
   (I) a block copolymer having a number average molecular weight of 30,000 to 200,000, or a hydrogenated product thereof;
   (II) an acryl-based polymer; and
   (III) a softening agent;
   wherein:
   the block copolymer comprises a polymer block (A) and a polymer block (B);
   the polymer block (A) comprises a-methylstyrene units in an amount of 50% by mass or more based on a total mass of the polymer block (A);
   the polymer block (B) comprises conjugated diene compound units or isobutylene units in an amount of 50% by mass or more based on a total mass of the polymer block (B);
   component (I), component (II), and component (III) are present in a ratio satisfying formulae (1) and (2):

$$0.05 \leq W(II)/W(I) \leq 2 \quad (1)$$

$$0 \leq W(III)/(W(I)+W(II)+W(III)) \leq 0.5 \quad (2)$$

where W(I), W(II), and W(III) represent a content by mass of component (I), component (II), and component respectively, in the thermoplastic polymer composition;
   the thermoplastic polymer composition has a sea-island structure in which component (II) is dispersed in the form of particles in a continuous phase including component (I);
   an average dispersed particle diameter of the dispersed particles of component (II) is 200 nm or less; and
   35% or more of the dispersed particles of component (II) have a dispersed particle diameter of 40 nm or more and less than 60 nm.

2. The thermoplastic polymer composition according to claim 1, wherein a haze value measured in accordance with JIS K 7105, using a specimen of the thermoplastic polymer composition having a thickness of 200 μm, is 1.4 or less.

3. The thermoplastic polymer composition according to claim 1, wherein, when a needle having a diameter of 1 mm and a tip radius of 0.5 mm is thrust into a specimen of the thermoplastic polymer composition molded to have a thickness of 200 μm at a speed of 50 mm/min in accordance with JIS Z 1707, a thrust strength at a time of needle penetration is 19 N or more.

4. The thermoplastic polymer composition according to claim 1, wherein, in component (I):
   a number average molecular weight of the polymer block (A) is 2,000 to 20,000;
   the polymer block (B) comprises a block (b1) and a block (b2);
   the block (b1) has a content of 1,4-bond structural units of the conjugated diene compound units of less than 30% by mole;
   the block (b2) has a number average molecular weight of 3,500 to 65,000; and
   the block (b2) has a content of 1,4-bond structural units of the conjugated diene compound units of 30% by mole or more.

5. The thermoplastic polymer composition according to claim 1, wherein a specific gravity of thermoplastic polymer composition, measured by an immersion method in accordance with ISO 1183, is 0.9 g/cm$^3$ to 1.08 g/cm$^3$.

6. The thermoplastic polymer composition according to claim 1, wherein 40% to 60% of the dispersed particles of component (II) have a dispersed particle diameter of 40 nm or more and less than 60 nm.

7. A sheet or film produced using the thermoplastic polymer composition according to claim 1.

8. The sheet or film according to claim 7, wherein the haze value measured using a specimen having a thickness of 200 μm in accordance with HS K 7105 is 1.4 or less, and
   when a needle having a diameter of 1 mm and a tip radius of 0.5 mm is thrust into a specimen having a thickness of 200 μm at a speed of 50 mm/min, the thrust strength at a time of needle penetration is 19 N or more in accordance with JIS Z 1707.

9. A multi-layered film comprising a layer containing the thermoplastic polymer composition according to claim 1.

10. A method for producing the sheet or film according to claim 7, comprising a step of performing molding by using a film molding device including a static mixer.

11. The thermoplastic polymer composition according to claim 1, wherein component (I) comprises a (poly(α-methyl styrene)-polybutadiene-poly(a-methylstyrene) triblock copolymer, or a hydrogenated product thereof.

12. The thermoplastic polymer composition according to claim 4, wherein component (I) comprises a (poly(α-methyl styrene)-polybutadiene-poly(a-methylstyrene) triblock copolymer having the structure A-b1-b2-X-b2-b1-A where X is a residue of a coupling agent, or a hydrogenated product thereof.

13. The thermoplastic polymer composition according to claim 1, wherein component (II) comprises polymethyl methacrylate.

14. The thermoplastic polymer composition according to claim 1, wherein component (II) comprises polymethyl methacrylate and at least one of an ethylene-methyl acrylate copolymer, an ethylene-ethyl acrylate copolymer, and an ethylene-butyl acrylate copolymer.

15. The thermoplastic polymer composition according to claim 1, wherein component (II) comprises polymethyl methacrylate and an ethylene-methyl acrylate copolymer.

16. The thermoplastic polymer composition according to claim 1, wherein component (III) comprises at least one of a paraffin-based oil and an ethylene-α-olefin copolymerization oligomer.

17. The thermoplastic polymer composition according to claim 1, wherein component (III) comprises a paraffin-based oil.

18. The thermoplastic polymer composition according to claim 4, wherein:
- component (I) comprises a (poly(α-methyl styrene)-polybutadiene-poly(α-methylstyrene) triblock copolymer having the structure A-b1-b2-X-b2-b1-A where X is a residue of a coupling agent, or a hydrogenated product thereof;
- component (II) comprises polymethyl methacrylate; and
- component (III) comprises a paraffin-based oil.

19. The thermoplastic polymer composition according to claim 1, wherein:

$$0.6 \leq W(II)/W(I) \leq 1.3.$$

20. The thermoplastic polymer composition according to claim 1, wherein:

$$0.03 \leq W(III)/(W(I)+W(II)+W(III)) \leq 0.3.$$

* * * * *